(12) United States Patent
Verseman

(10) Patent No.: US 11,821,348 B1
(45) Date of Patent: Nov. 21, 2023

(54) SYSTEMS AND METHODS FOR MOUNTING AN AFTERTREAMENT SYSTEM COMPONENT

(71) Applicant: Cummins Emission Solutions Inc., Columbus, IN (US)

(72) Inventor: Corey Verseman, Fitchburg, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/878,212

(22) Filed: Aug. 1, 2022

(51) Int. Cl.
*F01N 13/18* (2010.01)
*F16L 23/032* (2006.01)

(52) U.S. Cl.
CPC ..... *F01N 13/1822* (2013.01); *F01N 13/1805* (2013.01); *F01N 13/1811* (2013.01); *F01N 13/1855* (2013.01); *F16L 23/032* (2013.01); *F01N 2450/24* (2013.01)

(58) Field of Classification Search
CPC ............. F01N 13/1805; F01N 13/1811; F01N 13/1822; F16L 23/032; F16B 39/10
See application file for complete search history.

(56) References Cited

U.S. PATENT DOCUMENTS

| | | | |
|---|---|---|---|
| 9,470,134 B2 | 10/2016 | Hirukawa | |
| 2009/0230601 A1 | 9/2009 | Lenda | |
| 2011/0133451 A1* | 6/2011 | Singh | F16L 23/02 285/405 |
| 2017/0044966 A1* | 2/2017 | Rodecker | F01N 13/1822 |
| 2017/0342890 A1 | 11/2017 | Torizuka | |
| 2020/0109803 A1* | 4/2020 | Rose | F16L 23/032 |
| 2021/0262380 A1* | 8/2021 | Garcia Ramirez | F16L 27/1004 |

FOREIGN PATENT DOCUMENTS

| | | | | |
|---|---|---|---|---|
| DE | 102008010629 A1 | * | 9/2009 | ......... F01N 13/1805 |
| EP | 1235021 A1 | * | 8/2002 | ......... F01N 13/1805 |
| FR | 2883063 A1 | * | 9/2006 | ......... F01N 13/1805 |
| GB | 2478607 A | * | 9/2011 | ............. B60K 13/04 |
| KR | 200153062 Y1 | * | 8/1999 | |
| KR | 20210151592 A | * | 12/2021 | |
| WO | WO-2012013584 A1 | * | 2/2012 | ............. F01N 13/10 |

OTHER PUBLICATIONS

Machine translation of DE 102008010629 A1, accessed Apr. 7, 2023. (Year: 2023).*
Machine translation of EP 1235021 A1, accessed Apr. 7, 2023. (Year: 2023).*
Machine translation of KR 200153062 Y1, accessed Apr. 7, 2023. (Year: 2023).*

* cited by examiner

*Primary Examiner* — Jonathan R Matthias
(74) *Attorney, Agent, or Firm* — Foley & Lardner LLP

(57) ABSTRACT

An aftertreatment system includes a first mounting plate and a first hanger rod. The first mounting plate includes a first aperture and non-circular recessed portion aligned with the first aperture. The first hanger rod comprises a mounting plate connection portion and a shaft. The mounting plate includes a non-circular mounting head having a portion that is engaged with a portion the non-circular recessed portion so as to prevent rotation of the mounting plate connection relative to the first mounting plate. The shaft extends from the non-circular mounting head through the first aperture.

29 Claims, 19 Drawing Sheets

2

SYSTEMS AND METHODS FOR MOUNTING AN AFTERTREAMENT SYSTEM COMPONENT

TECHNICAL FIELD

The present disclosure relates generally to the field of mounting aftertreatment system components.

BACKGROUND

For internal combustion engines, such as diesel engines, nitrogen oxide ($NO_x$) compounds may be emitted in exhaust. It may be desirable to reduce $NO_x$ emissions to comply with environmental regulations, for example. To reduce $NO_x$ emissions, an aftertreatment system where the exhaust gas is dosed with a reductant may be mounted to a vehicle.

Typically, these aftertreatment systems are attached to a chassis of a vehicle with components that are welded or otherwise irremovably attached to the chassis. This limits flexibility in attaching aftertreatment system components. Additionally, multiple designs of these aftertreatment systems may be needed for different applications. For example, an aftertreatment system with irremovable components may be designed to attach to a first chassis design. However, the irremovable components of the aftertreatment system may interfere with components on a second chassis design rendering the aftertreatment system unsuitable for use with the second chassis design. As a result, a new aftertreatment system design may be necessary for use with the second chassis design. This may make manufacturing complex and increase cost associated with installing aftertreatment systems on various chassis designs.

SUMMARY

In one embodiment, an aftertreatment system includes a first mounting plate and a first hanger rod. The first mounting plate includes a first aperture and non-circular recessed portion aligned with the first aperture. The first hanger rod comprises a mounting plate connection portion and a shaft. The mounting plate includes a non-circular mounting head having a portion that is engaged with a portion the non-circular recessed portion so as to prevent rotation of the mounting plate connection portion relative to the first mounting plate. The shaft extends from the non-circular mounting head through the first aperture.

In one embodiment, a method of mounting an aftertreatment system including providing an aftertreatment system first component and a first hanger rod. The aftertreatment system first component includes a first mounting plate with a first aperture and a non-circular recessed portion. The hanger rod including a mounting plate connection portion having a non-circular mounting head and a shaft. The method further includes moving the mounting plate connection portion toward the first aperture such that the mounting plate connection portion is positioned within the first aperture and a portion of the non-circular mounting head is engaged within a portion of the non-circular recessed portion to prevent rotation of the mounting plate connection portion relative to the first mounting plate.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

DETAILED DESCRIPTION

Figure 1:
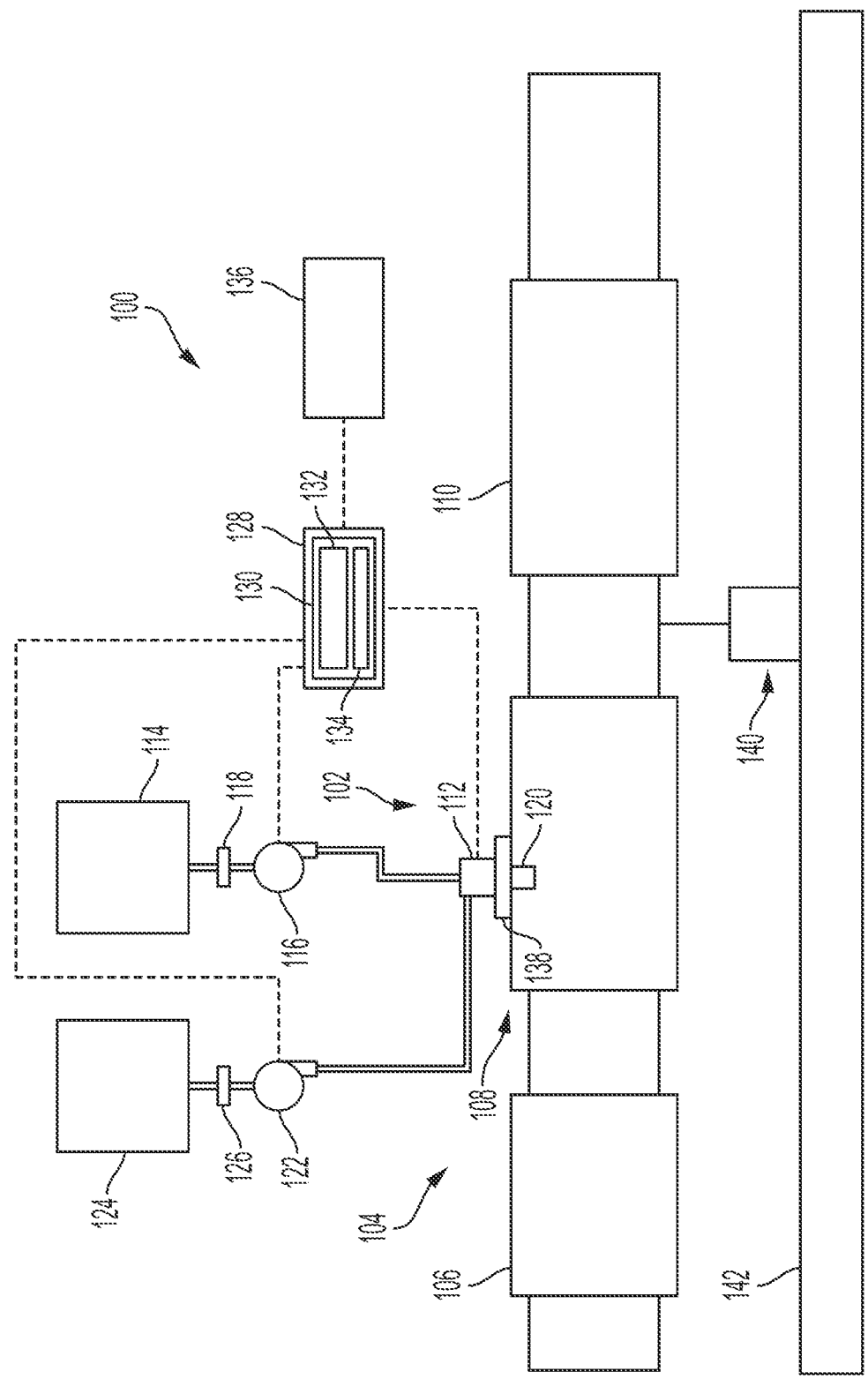
FIG. 1 is a block schematic diagram of an example aftertreatment system.

Following below are detailed descriptions of various concepts related to and implementations of, methods, and apparatuses, for mounting an exhaust gas aftertreatment system (or simply "aftertreatment system") to a vehicle. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions from an internal engine, it may be desirable to connect an aftertreatment system to the vehicle. However, current systems are connected to a vehicle chassis using fixed and/or welded components, which increase the difficulty of servicing the aftertreatment system. Aside from these constraints, various aftertreatment systems may have to be designed based on the application because the fixed components may not facilitated coupling to all chassis designs. This increases manufacturing costs and time.

Implementations herein are directed to a system and apparatus for removably mounting a portion of an aftertreatment system to a chassis of a vehicle. For example, the aftertreatment system includes an aftertreatment system first component with a flange that facilitates attachment and detachment of a hanger rod to the aftertreatment system first component. By facilitating attachment and detachment of the aftertreatment system, the flange and hanger rods described herein provide one or more benefits. For example, one benefit is providing a non-permanent method for mechanically fastening at least one aftertreatment system component, and therefore an aftertreatment system, to a chassis. This may, for example, facilitate removal of aftertreatment system component from the chassis so that the aftertreatment system component can be rapidly replaced or serviced. Another benefit of the flange and hanger rods described herein is providing operating clearance during maintenance of an aftertreatment system. For example, the hanger rods can retain the flange, and therefore at least one aftertreatment component, at a target distance from a chassis, which can provide the operating clearance that eases maintenance. Further, other benefits include providing quick and efficient installation and de-installation for maintenance of the aftertreatment system and providing interchangeable parts for a wide variety of configurations of an aftertreatment system. The system and apparatus for removably mounting a portion of an aftertreatment system additionally provides the benefit of reducing cost of manufacturing as the system and apparatus includes separate components which are manufactured individually. For example, if a new component is needed for a particular aftertreatment system design, then only that component is manufactured and integrated in the existing system. This prevents remanufacturing of the entire system which would increase manufacturing cost.

II. Overview of Example Exhaust Gas Aftertreatment System

FIG. 1 depicts a vehicle system 100. The vehicle system 100 includes an exhaust gas aftertreatment system 101 having an example reductant delivery system 102 for an exhaust conduit system 104. The exhaust gas aftertreatment system 101 includes the reductant delivery system 102, a particulate filter (e.g., a diesel particulate filter (DPF)) 106, an aftertreatment system first component 108 (e.g., exhaust conduit, decomposition chamber, reactor, reactor pipe, DPF, SCR catalyst, a diesel oxidation catalyst (DOC), etc.), an aftertreatment system second component 110 (e.g., exhaust conduit, decomposition chamber, reactor, reactor pipe, DPF, SCR catalyst, a diesel oxidation catalyst (DOC), etc.), and a mounting system 140.

The DPF 106 is configured to (e.g., structured to, able to, etc.) remove particulate matter, such as soot, from exhaust gas flowing in the exhaust conduit system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

In some embodiments, the aftertreatment system first component 108 is configured to convert a reductant into ammonia. The reductant may be, for example, urea, diesel exhaust fluid (DEF), Adblue®, a urea water solution (UWS), an aqueous urea solution (e.g., AUS32, etc.), and/or other similar fluids. The aftertreatment system first component 108 includes an inlet in fluid communication with the DPF 106 to receive the exhaust gas containing NOx emissions and an outlet for the exhaust gas, $NO_x$ emissions, ammonia, and/or reductant to flow to the aftertreatment system second component 110.

The reductant delivery system 102 includes a doser 112 (e.g., dosing module, etc.) configured to dose the reductant into the aftertreatment system first component 108 (e.g., via an injector). The doser 112 is mounted to the aftertreatment system first component 108 such that the doser 112 may dose the reductant into the exhaust gas flowing through the exhaust conduit system 104. The doser 112 may include an insulator interposed between a portion of the doser 112 and the portion of the aftertreatment system first component 108 on which the doser 112 is mounted.

The doser 112 is fluidly coupled to (e.g., fluidly configured to communicate with, etc.) a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the doser 112. In some embodiments, the reductant pump 116 is pressure-controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled (e.g., fastened, attached, affixed, welded, bolted, etc.) to a chassis of a vehicle associated with the exhaust gas aftertreatment system 101.

The doser 112 includes at least one injector 120. Each injector 120 is configured to dose the reductant into the exhaust gas (e.g., within the aftertreatment system first component 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the doser 112 via a conduit. In these embodiments, the doser 112 is configured to mix the air and the reductant into an air-reductant mixture and to provide the air-reductant mixture into the aftertreatment system first component 108. In other embodiments, the reductant delivery system 102 does not include the air pump 122 or the air source 124. In such embodiments, the doser 112 is not configured to mix the reductant with air.

The doser 112 and the reductant pump 116 are also electrically or communicatively coupled to a reductant delivery system controller 128. The reductant delivery system controller 128 is configured to control the doser 112 to dose the reductant into the aftertreatment system first component 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions, which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the exhaust gas aftertreatment system 101. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The exhaust gas aftertreatment system 101 also includes a doser mounting bracket 138 (e.g., mounting bracket, coupler, plate, etc.). The doser mounting bracket 138 couples the doser 112 to a component of the exhaust gas aftertreatment system 101. The doser mounting bracket 138 is configured to mitigate the transfer of heat from the exhaust gas passing through the exhaust conduit system 104 to the doser 112. In this way, the doser 112 is capable of operating more efficiently and desirably than other dosers which are not able to mitigate the transfer of heat. The doser mounting bracket 138 is configured to aid in reliable installation of the doser 112. This may decrease manufacturing costs associated with the exhaust gas aftertreatment system 101 and ensure repeated desirable installation of the doser 112.

In various embodiments, the doser mounting bracket 138 couples the doser 112 to the aftertreatment system first component 108. In some embodiments, the doser mounting bracket 138 couples the doser 112 to an exhaust conduit of the exhaust conduit system 104. For example, the doser mounting bracket 138 may couple the doser 112 to an exhaust conduit of the exhaust conduit system 104 that is upstream of the aftertreatment system first component 108 or to an exhaust conduit of the exhaust conduit system 104 that is downstream of the aftertreatment system first component 108. In some embodiments, the doser mounting bracket 138 couples the doser 112 to the DPF 106 and/or the aftertreatment system second component 110. The location of the doser mounting bracket 138 may be varied depending on the application of the exhaust gas aftertreatment system 101. For example, in some exhaust gas aftertreatment systems 101, the doser mounting bracket 138 may be located further upstream than in other exhaust gas aftertreatment systems 101. Furthermore, some exhaust gas aftertreatment systems 101 may include multiple dosers 112 and therefore may include multiple doser mounting brackets 138.

The aftertreatment system first component 108 is located upstream of the aftertreatment system second component 110. As a result, the reductant is injected upstream of the aftertreatment system second component 110 such that the aftertreatment system second component 110 receives a mixture of the reductant and exhaust gas. The reductant droplets undergo the processes of evaporation, thermolysis, and hydrolysis to form non-NO$_x$ emissions (e.g., gaseous ammonia, etc.) within the exhaust conduit system 104.

The aftertreatment system second component 110 includes an inlet in fluid communication with the aftertreatment system first component 108 from which exhaust gas and reductant are received and an outlet in fluid communication with an end of the exhaust conduit system 104.

The exhaust gas aftertreatment system 101 may further include an oxidation catalyst (e.g., DOC) in fluid communication with the exhaust conduit system 104 (e.g., downstream of the aftertreatment system second component 110 or upstream of the DPF 106) to oxidize hydrocarbons and carbon monoxide in the exhaust gas.

In some implementations, the DPF 106 may be positioned downstream of the aftertreatment system first component 108. For instance, the DPF 106 and the aftertreatment system second component 110 may be combined into a single unit. In some implementations, the doser 112 may instead be positioned downstream of a turbocharger or upstream of a turbocharger The exhaust gas aftertreatment system 101 includes the mounting system 140. As described in more detail herein, the mounting system 140 is configured to removably couple (attached, screwed, fastened, pinned, bolted, interference fit, etc.) a portion of the exhaust gas aftertreatment system 101 to vehicle. In some embodiments, the portion of the exhaust gas aftertreatment system 101 is the aftertreatment system first component 108. The portion of the exhaust gas aftertreatment system 101 may be the aftertreatment system first component 108 and the aftertreatment system second component 110. In this way, the exhaust gas aftertreatment system 101 may be attached and detached from a vehicle for servicing or repair. The mounting system 140 is configured to aid in reliable installation of the exhaust gas aftertreatment system.

In various embodiments, the mounting system 140 removably couples to the aftertreatment system first component 108 to removably couple the exhaust gas aftertreatment system 101 to the vehicle. In some embodiments, the mounting system 140 removably couples the aftertreatment system first component 108 to the aftertreatment system second component 110 and couples the exhaust gas aftertreatment system 101 to the vehicle.

The vehicle system 100 includes a chassis 142 (e.g., frame, etc.) of 142. The chassis 142 supports the body of the vehicle and is configured to receive at least one portion of exhaust gas aftertreatment system 101. Specifically, the mounting system 140 is coupled to the chassis 142, as seen in FIG. 1, and as described herein. By this way, the mounting system 140 facilitates coupling of the at least one portion of the exhaust gas aftertreatment system 101.

III. Example Mounting System

Figure 2:
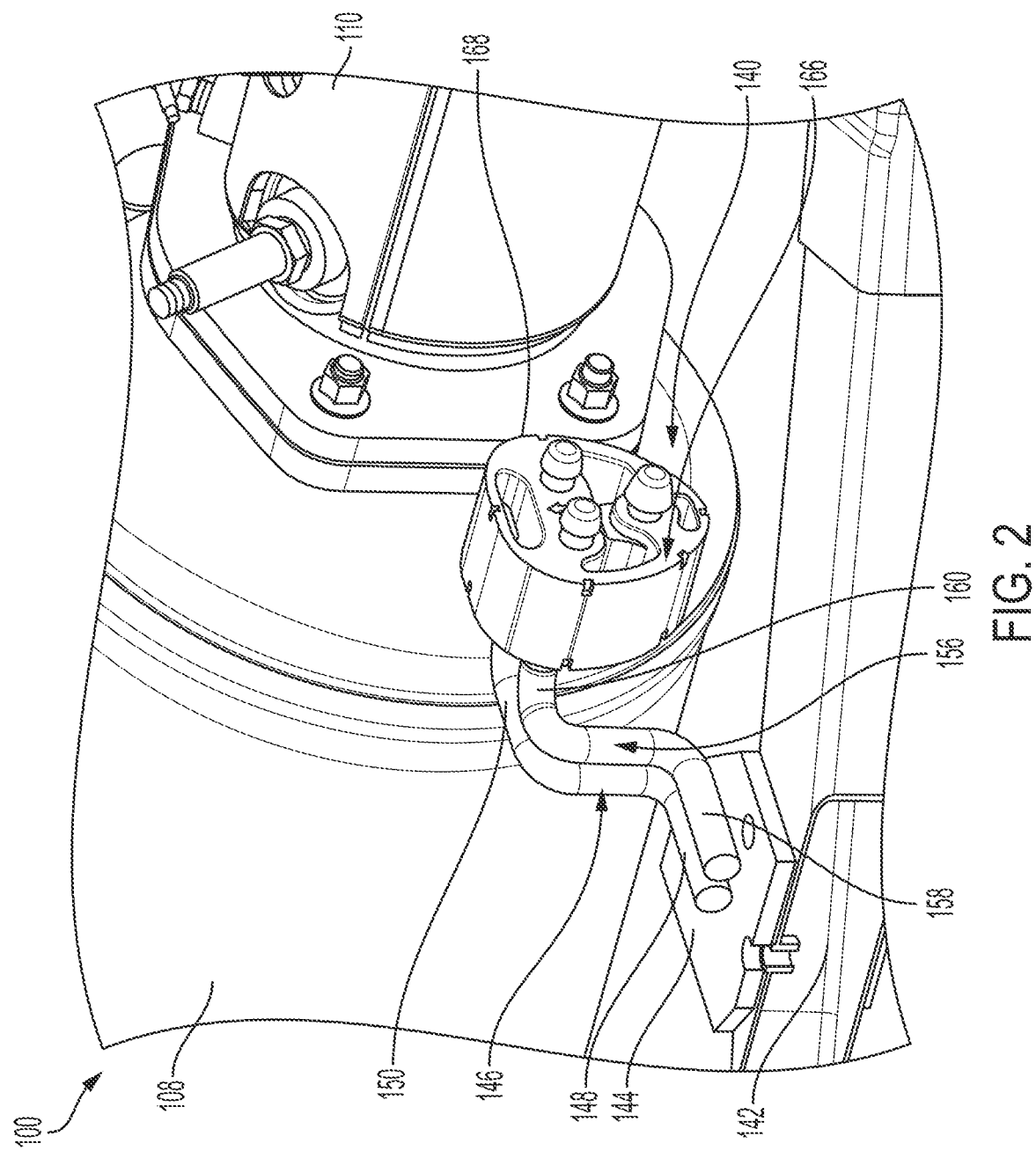
FIG. 2 is a perspective view of a portion of the aftertreatment system mounted on a vehicle chassis of FIG. 1.
Figure 3:
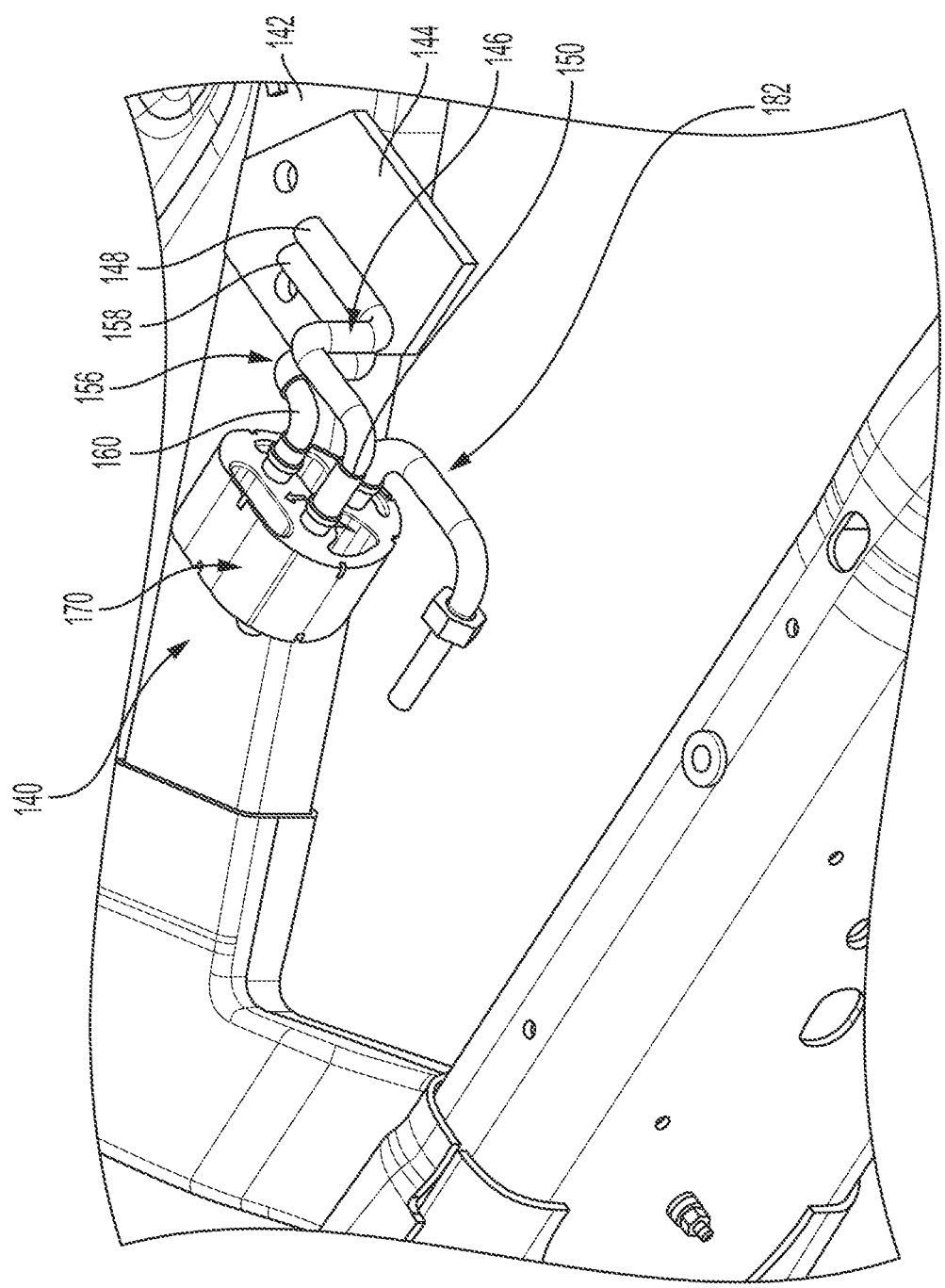
FIG. 3 is a perspective view of a portion of the aftertreatment system shown in FIG. 2.
Figure 4:
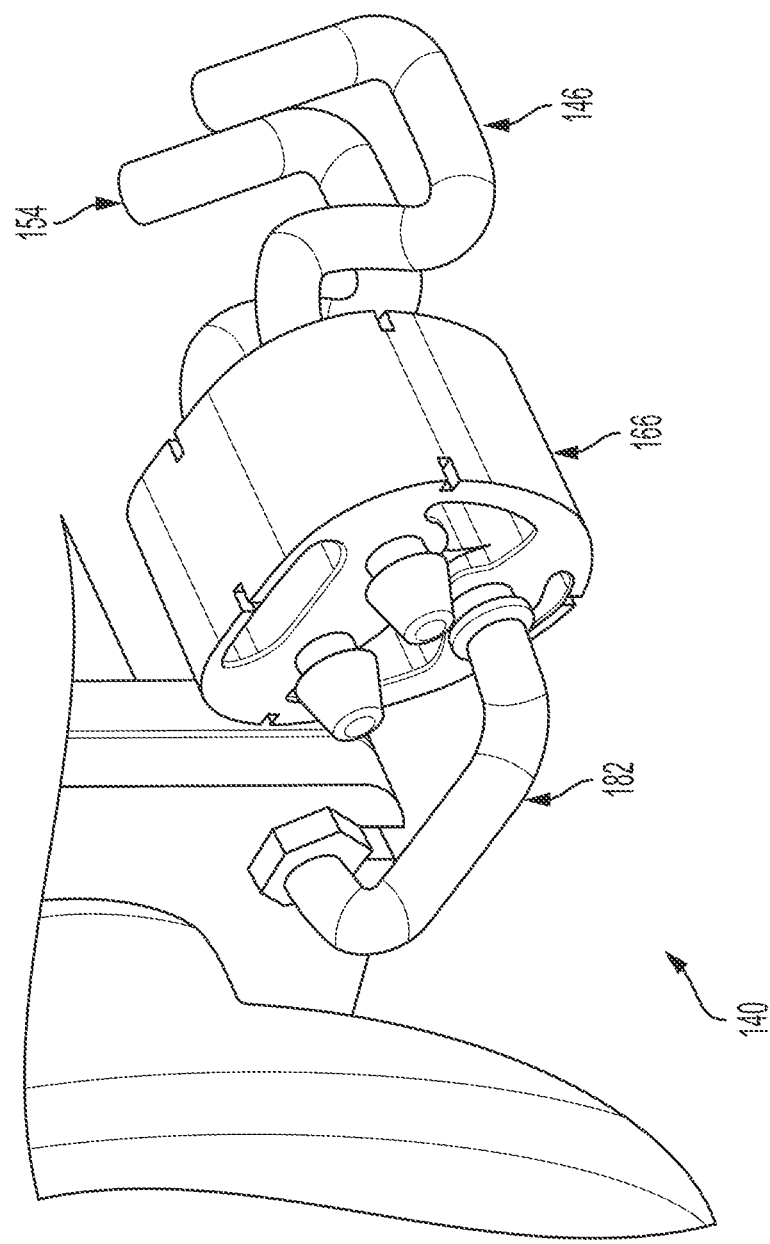
FIG. 4 is another perspective view of a portion of the aftertreatment system of FIG. 2
Figure 6:
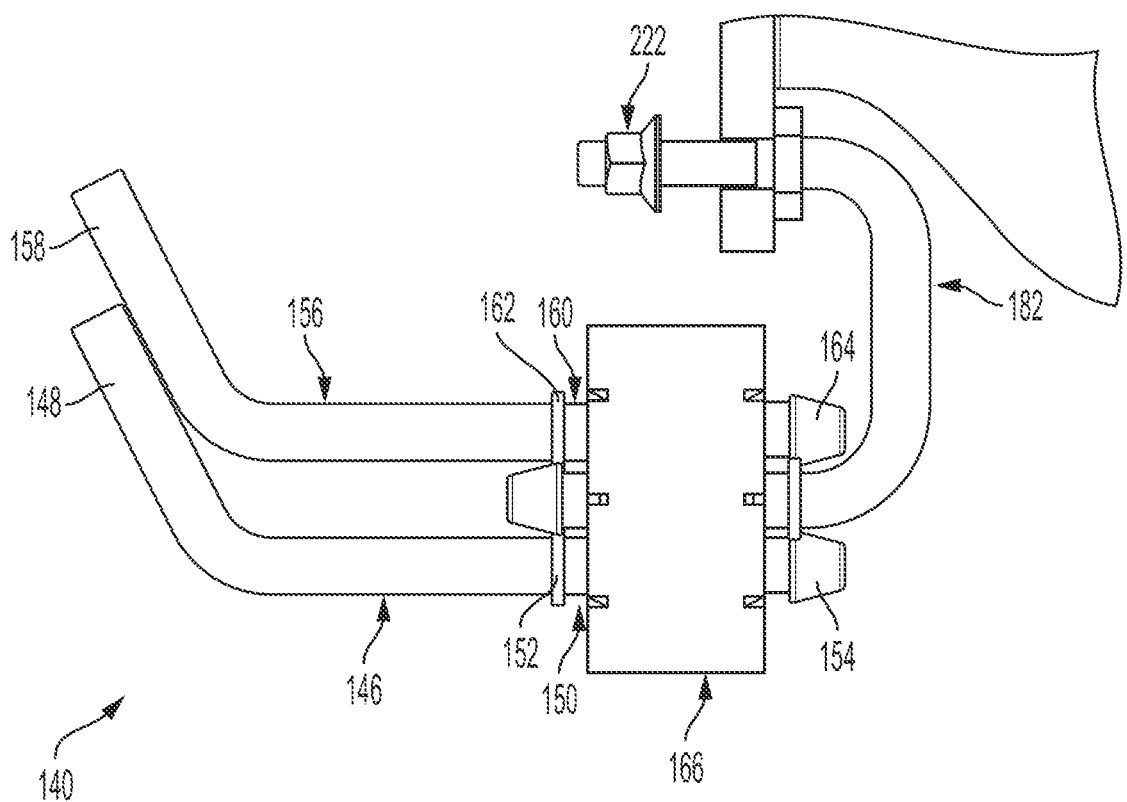
FIG. 6 is a top view of a portion of the aftertreatment system of FIG. 2
Figure 9:
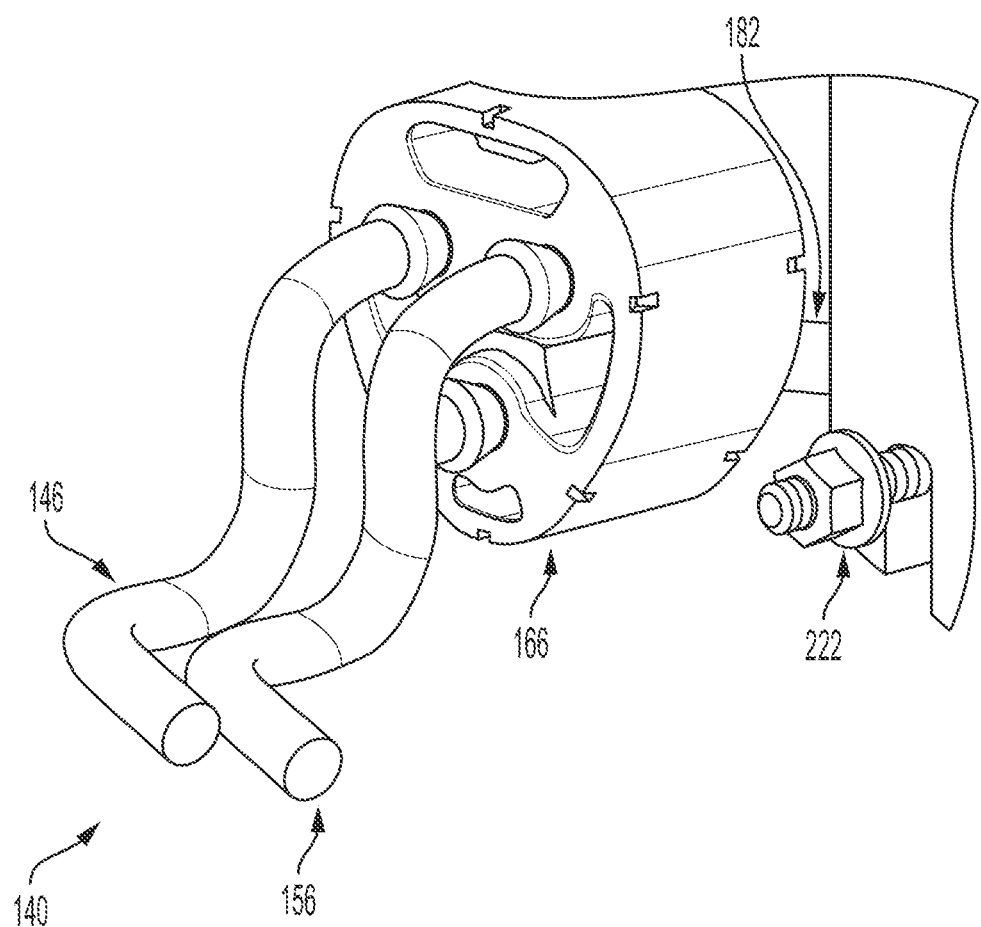
FIG. 9 is another perspective view of a portion of the aftertreatment system of FIG. 2.

FIGS. 2-4, 6-7, and 9 illustrate the mounting system 140 coupling a portion of the exhaust gas aftertreatment system 101 to the chassis 142 of the vehicle. The portion of the exhaust gas aftertreatment system may be the aftertreatment system first component 108. The mounting system 140 includes a chassis flange 144 (e.g., mounting plate, metal plate, coupling plate, etc.). The chassis flange 144 is coupled to the chassis 142 of the vehicle. The mounting system 140 also includes a first vehicle hanger rod 146 (e.g., first hanger rod, second hanger rod, third hanger rod, etc.). The first vehicle hanger rod 146 is coupled to the chassis flange 144. As seen in FIGS. 4, 6, and 9, the first vehicle hanger rod 146 may be, linear, curvilinear, bent, or curved. The first vehicle hanger rod 146 may be formed of a metal (e.g., steel, aluminum, etc.). In some embodiments, the first vehicle hanger rod 146 is formed of a metal alloy (e.g., aluminum alloy, nickel alloy, stainless steel, etc.). The first vehicle hanger rod 146 includes a first vehicle connecting portion 148. The first vehicle connecting portion 148 is coupled to the chassis flange 144. The first vehicle hanger rod 146 includes a first mount connection portion 150. The first mount connection portion 150 is contiguous with the first vehicle connecting portion 148. The first mount connection portion 150 includes a first mount connection stop 152 and a second mount connection stop 154. As is explained in more detail herein, the first mount connection stop 152 and the second mount connection stop 154 facilitate retention of at least one component of the mounting system 140 relative to the first vehicle hanger rod 146.

The mounting system 140 further includes a second vehicle hanger rod 156 (e.g., first hanger rod, second hanger rod, third hanger rod, etc.). The second vehicle hanger rod 156 is substantially similar to the first vehicle hanger rod 146. The second vehicle hanger rod 156 is coupled to the chassis flange 144 adjacent to the first vehicle hanger rod 146. The second vehicle hanger rod 156 may be an identical shape as the first vehicle hanger rod 146. The second vehicle hanger rod 156 includes a second vehicle connecting portion 158. The second vehicle connecting portion 158 is coupled to the chassis flange 144 adjacent to the first vehicle connecting portion 148. The second vehicle hanger rod 156 includes a second mount connection portion 160. The second mount connection portion 160 is contiguous with the second vehicle connecting portion 158. The second mount connection portion 160 includes a first mount connection stop 162 and a second mount connection stop 164. As is explained in more detail herein, the first mount connection stop 162 and the second mount connection stop 164 facilitate retention of at least one component of the mounting system 140 relative to the second vehicle hanger rod 156.

The mounting system 140 includes an isolator mount 166 (e.g., rubber isolator mount, plate mount, etc.). The isolator mount 166 is configured to facilitate connection of the exhaust gas aftertreatment system 101 to the chassis 142 of the vehicle. Referring to FIG. 2, the isolator mount 166 includes an isolator mount body 168. The isolator mount body 168 is formed from a dampening material (e.g., rubber, polyurethane, etc.) and is configured to dampen vibrations of the vehicle system 100 when the vehicle is operated. The isolator mount body 168 may be in a circular shape or a non-circular shape (e.g., ovular, hexagonal, square, rounded, etc.). The isolator mount body 168 is configured to facilitate parallel placement of the first vehicle hanger rod 146 and a second vehicle hanger rod 156.

Figure 5:
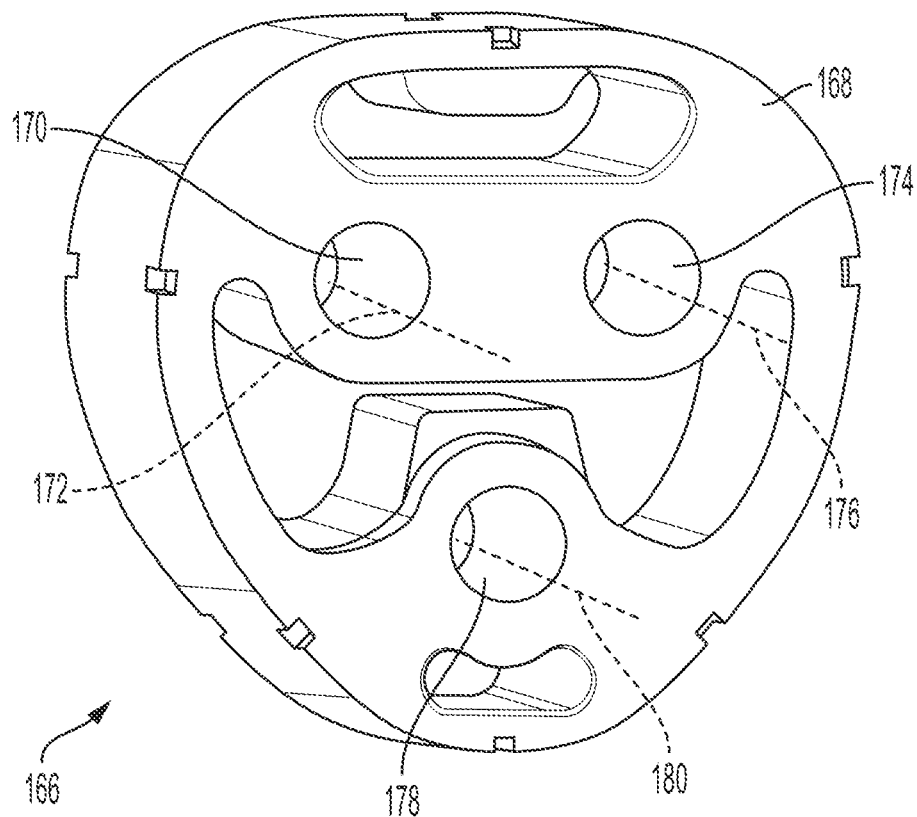
FIG. 5 is a perspective view of an isolator mount.

As shown in FIG. 5, which illustrates a perspective view of the isolator mount 166, the isolator mount 166 further includes a first vehicle hanger rod through-hole 170 (e.g., first through-hole, second through-hole, third through-hole, etc.). The first vehicle hanger rod through-hole 170 is formed on the isolator mount body 168 and centered on a first vehicle hanger rod through-hole axis 172 (e.g., first through-hole axis, second through-hole axis, third through-hole axis, etc.). As is described in more detail herein, the first vehicle hanger rod through-hole 170 is configured to receive the first mount connection portion 150. Specifically, the first mount connection portion 150 is positioned within the first vehicle hanger rod through-hole 170 so as to removably couple the first vehicle hanger rod 146 to the isolator mount 166. In some embodiments, the first mount connection portion 150 is positioned so as to be centered on the first vehicle hanger rod through-hole axis 172. The first mount connection portion 150 is positioned within the first vehicle hanger rod through-hole 170 such that the isolator mount 166 is positioned between the first mount connection stop 152 and the second mount connection stop 154.

The isolator mount 166 further includes a second vehicle hanger rod through-hole 174 (e.g., first through-hole, second through-hole, third through-hole, etc.). The second vehicle hanger rod through-hole 174 is configured to receive the second mount connection portion 160. The second vehicle hanger rod through-hole 174 is formed on the isolator mount body 168 and centered on a second vehicle hanger rod through-hole axis 176 (e.g., first through-hole axis, second through-hole axis, third through-hole axis, etc.). The second vehicle hanger rod through-hole axis 176 is parallel to the first vehicle hanger rod through-hole axis 172 such that the second vehicle hanger rod through-hole 174 is parallel to the first vehicle hanger rod through-hole 170. The second mount connection portion 160 is positioned within the second vehicle hanger rod through-hole 174 so as to removably couple the second vehicle hanger rod 156 to the isolator mount 166. In some embodiments, the second mount connection portion 160 is positioned so as to be centered on the second vehicle hanger rod through-hole axis 176. The second mount connection portion 160 is positioned within the second vehicle hanger rod through-hole 174 such that the isolator mount 166 is positioned between the first mount connection stop 162 and the second mount connection stop 164.

The isolator mount further includes an aftertreatment component hanger rod through-hole 178 (e.g., first through-hole, second through-hole, third through-hole, etc.). The aftertreatment component hanger rod through-hole 178 is configured to receive a portion of the mounting system 140, as described herein. The aftertreatment component hanger rod through-hole 178 is formed on the isolator mount body 168 and centered on an aftertreatment component hanger rod through-hole axis 180. The aftertreatment component hanger rod through-hole axis 180 is equidistant from the first vehicle hanger rod through-hole axis 172 and the second vehicle hanger rod through-hole axis 176 such that the aftertreatment component hanger rod through-hole 178 is equidistant from the first vehicle hanger rod through-hole 170 and second vehicle hanger rod through-hole 174.

Figure 7:
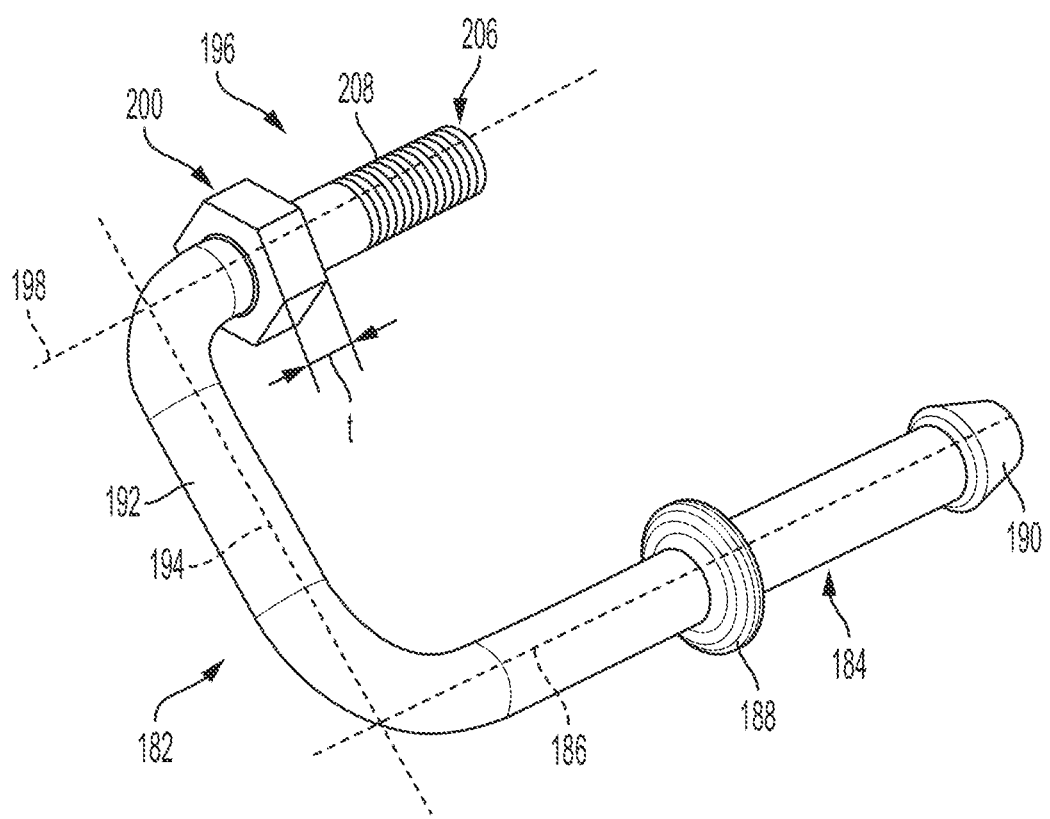
FIG. 7 is a perspective view of a first hanger rod.

Referring to FIGS. 3 and 4, the mounting system 140 further includes an aftertreatment component hanger rod 182 (e.g., a first hanger rod, a second hanger rod, a third hanger rod, etc.). The aftertreatment component hanger rod 182 is configured to facilitate connection of a portion of the exhaust gas aftertreatment system 101 to the isolator mount 166. The aftertreatment component hanger rod 182 may be a j-shaped hanger rod, a linear hanger rod, a curvilinear hanger rod, or any other suitable shape. In some embodiment, the aftertreatment component hanger rod 182 is a j-shaped hanger rod or curvilinear. This arrangement may provide the benefit of the positioning a portion of the exhaust gas aftertreatment system 101 when coupled to the chassis without significantly increasing the space necessary across the chassis 142. Further, the j-shaped or curvilinear aftertreatment component hanger rod 182 may rotate about the isolator mount 166, facilitating limited movement of the portion of the exhaust gas aftertreatment system 101 as the vehicle is in operation. This may decrease breakage (e.g., cracking, splitting, etc.) of components which otherwise would occur if the portion of the exhaust gas aftertreatment system 101 was position so as to be fixed and rigid in a location.. The aftertreatment component hanger rod 182 is removably coupled to the isolator mount 166 such that the aftertreatment system first component 108 is coupled to the chassis 142 of the vehicle. Referring to FIG. 7, the aftertreatment component hanger rod 182 includes an isolator mount connection portion 184. The isolator mount connection portion 184 is centered on an isolator mount connection portion axis 186. The isolator mount connection portion 184 is positioned within aftertreatment component hanger rod through-hole 178 so as to removably couple the aftertreatment component hanger rod 182 to the isolator mount 166. The isolator mount connection portion 184 is positioned such that the isolator mount connection portion axis 186 and the aftertreatment component hanger rod through-hole axis 180 are the same. The isolator mount connection portion 184 may include a first isolator mount connection portion stop 188 and a second isolator mount connection portion stop 190. In some embodiments, the isolator mount connection portion 184 is positioned within the aftertreatment component hanger rod through-hole such that the isolator mount 166 is positioned between the first isolator mount connection portion stop 188 and second isolator mount connection portion stop 190.

Referring to FIG. 7, the aftertreatment component hanger rod 182 includes a connection portion 192. The connection portion 192 is contiguous with the isolator mount connection portion 184. The connection portion 192 is centered on a connection portion axis 194. The connection portion axis 194 is orthogonal to the isolator mount connection portion axis 186.

The aftertreatment component hanger rod 182 includes a mounting plate connection portion 196. The mounting plate connection portion 196 is centered on a mounting plate connection portion axis 198. The mounting plate connection portion axis 198 is parallel to the isolator mount connection portion axis 186 and orthogonal to the connection portion axis 194. The mounting plate connection portion 196 is contiguous with the connection portion 192. By this way, the mounting plate connection portion 196 is contiguous with and opposite of the isolator mount connection portion 184.

The mounting plate connection portion 196 includes a non-circular mounting head 200. The non-circular mounting head 200 facilitates connection of the aftertreatment component hanger rod 182 to the aftertreatment system first component 108, as described herein. The non-circular mounting head 200 is integrally formed with the mounting plate connection portion 196. In some embodiments, the non-circular mounting head 200 is coupled to the mounting plate connection portion 196. As utilized herein, two or more elements are "integrally formed" with each other when the two or more elements are formed and joined together as part of a single manufacturing process to create a single-piece or unitary construction that cannot be disassembled without an at least partial destruction of the overall component. The non-circular mounting head 200 has a first shape (e.g., ovular, hexagonal, parabolic, hyperbolic, grooved, curvilinear, etc.).

Figure 8A:
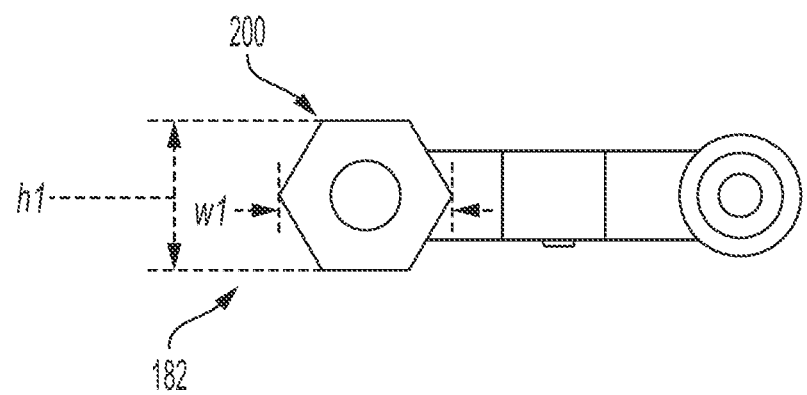
FIG. 8A is a front view of another first hanger rod.

Referring to FIG. 8A an exemplary embodiment of the aftertreatment component hanger rod 182 is shown. The non-circular mounting head 200, as shown in FIG. 8A, has a first shape which is hexagonal. The height, h1, of the non-circular mounting head 200 which is hexagonal may be approximately in a range of 10 millimeters (mm) to 64 mm (e.g., 10 mm, 11 mm, 13 mm, 14 mm, 16 mm, 19 mm, 21 mm, 22 mm, 24 mm, 25 mm, 29 mm, 32 mm, 34 mm, 35 mm, 38 mm, 41 mm, 43 mm, 45 mm, 48 mm, 51 mm, 57 mm, 64 mm, etc.). In some embodiments, the height, h1, of the non-circular mounting head 200 which is hexagonal may be approximately in a range of 0.1875 inches (in.) to 1.5 in. (e.g., 0.1875 in., 0.25 in., 0.3125 in., 0.375 in., 0.4375 in., 0.5 in., 0.5625 in., 0.625 in., 0.750 in., 0.8125 in., 0.875 in., 0.9375 in., 1 in., 1.125 in., 1.25 in., 1.3125 in., 1.375 in., 1.5 in., 1.625 in., 1.6875 in., 1.75 in., 1.875 in., 2 in., 2.125 in., 2.25 in., 2.5 in., etc.). The width, w1, of the non-circular mounting head 200, which is hexagonal, is substantially similar to the height. As seen in FIG. 7, the thickness, t, of the non-circular mounting head 200 may be approximately in a range of 3 mm to 30 mm (e.g., 2.85 mm, 3 mm, 5 mm, 10 mm, 15 mm, 20 mm, 25 mm, 30 mm, 31.5 mm, etc.). In some embodiments, the thickness, t, of the non-circular mounting head 200 may be approximately between 0.11 in. to 1.18 in. (e.g., 0.10 in., 0.11 in., 0.15 in., 0.30 in., 0.45 in., 0.60 in., 0.75 in., 0.90 in., 1.05 in., 1.10 in., 1.15 in., 1.18 in., 1.23 in., etc.)

Figure 8B:
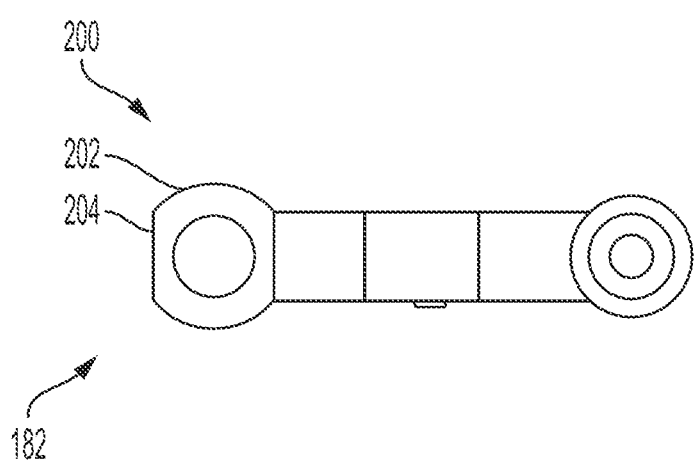
FIG. 8B is a front view of another first hanger rod.

Referring to FIG. 8B, an exemplary embodiment of the aftertreatment component hanger rod 182 is shown. The first shape of the non-circular mounting head 200, as shown in FIG. 8B, is a combination of being linear and curved. The non-circular mounting head 200 includes a plurality of sides. From the plurality of sides, the non-circular mounting head 200 includes a first side 202 and a second side 204. The first side 202 is contiguous with the second side 204. The first side 202 is flat side and the second side 204 is curved or arc-shaped. In some embodiments, the first side 202 and the second side 204 of the non-circular mounting head 200 are arc-shaped (e.g., ovular, rounded, etc.). The diameter of the non-circular mounting head 200 may be approximately in a range of 10 millimeters (mm) to 64 mm (e.g., 10 mm, 11 mm, 13 mm, 14 mm, 16 mm, 19 mm, 21 mm, 22 mm, 24 mm, 25 mm, 29 mm, 32 mm, 34 mm, 35 mm, 38 mm, 41 mm, 43 mm, 45 mm, 48 mm, 51 mm, 57 mm, 64 mm, etc.). In some embodiments, the diameter of the non-circular mounting head 200 may be approximately in a range of 0.1875 inches (in.) to 1.5 in. (e.g., 0.1875 in., 0.25 in., 0.3125 in., 0.375 in., 0.4375 in., 0.5 in., 0.5625 in., 0.625 in., 0.750 in., 0.8125 in., 0.875 in., 0.9375 in., 1 in., 1.125 in., 1.25 in., 1.3125 in., 1.375 in., 1.5 in., 1.625 in., 1.6875 in., 1.75 in., 1.875 in., 2 in., 2.125 in., 2.25 in., 2.5 in., etc.).

The mounting plate connection portion 196 further includes a shaft 206. The shaft 206 is integrally formed with and extends from the non-circular mounting head 200. The shaft 206 is configured to extend through a portion of the exhaust gas aftertreatment system 101 to facilitate fastening of the aftertreatment component hanger rod, as described herein. The shaft 206 has a length that may be approximately in a range between 0.25 in. and 1 in. (0.2375 in., 0.25 in., 0.35 in, 0.45 in., 0.55 in., 0.65 in., 0.75 in., 0.85 in., 0.95 in., 1 in, 1.05 in., etc.) The shaft 206 has a diameter that may be approximately in a range between 10 millimeters (mm) to 60 mm (e.g., 10 mm, 15 mm, 20 mm, 25 mm, 30 mm, 35 mm, 40 mm, 45 mm, 50 mm, 55 mm, 60 mm 63 mm, etc.). In some embodiments, the diameter of the shaft 206 may be approximately in a range of 0.39 inches (in.) to 2.36 in. (e.g., 0.39 in., 0.59 in., 0.78 in., 0.98 in., 1.18 in., 1.37 in., 1.57 in., 1.77 in. 1.96 in., 2.16 in., 2.36 in., 2.47 in., etc.) The shaft 206 may comprise a retainer 208 (e.g., male threads, female threads, etc.). As seen in FIG. 7, the retainer 208 of the shaft 206 are male threads. In some embodiments, the shaft 206 may be tapped such that the retainer 208 are female threads. In some embodiments, the retainer 208 may be an aperture configured to receive a fastener, as described herein.

Figure 10:
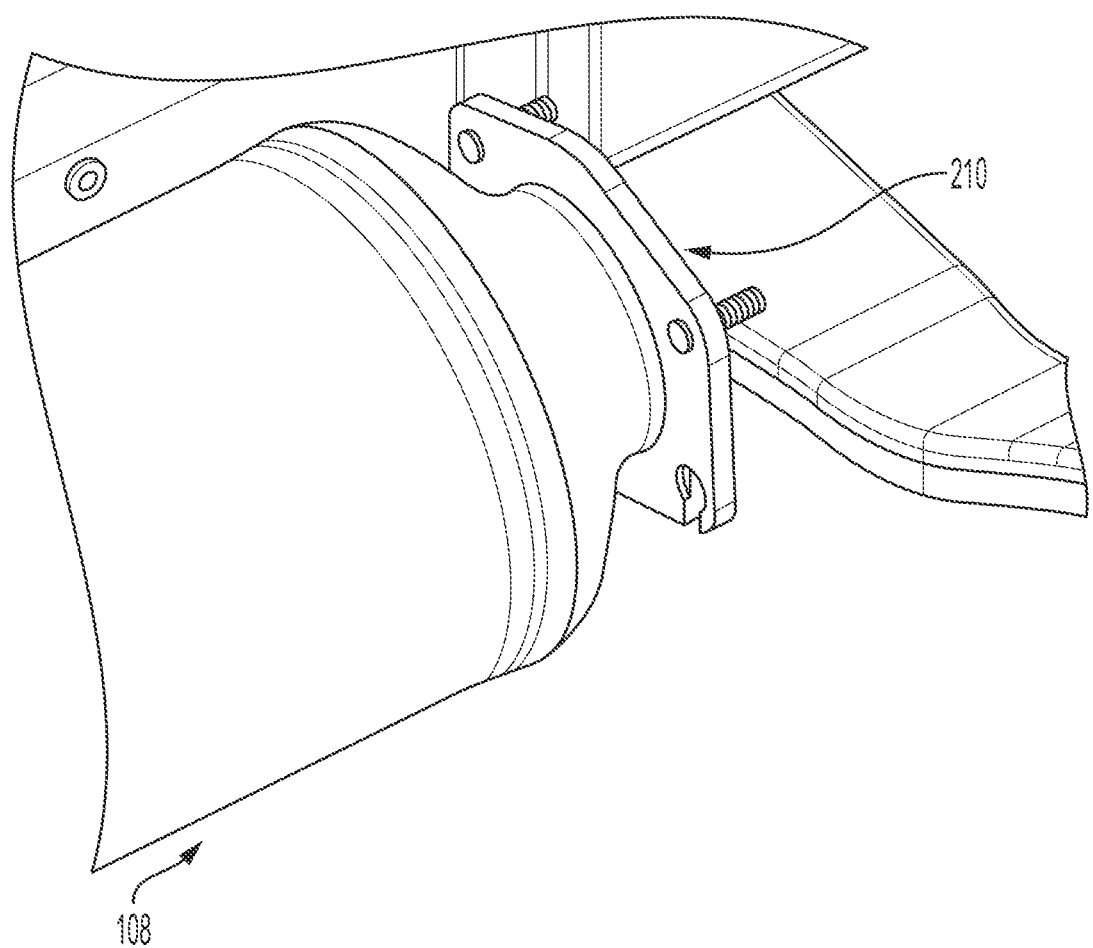
FIG. 10 is a perspective view of a portion of the aftertreatment system of FIG. 2.
Figure 11:
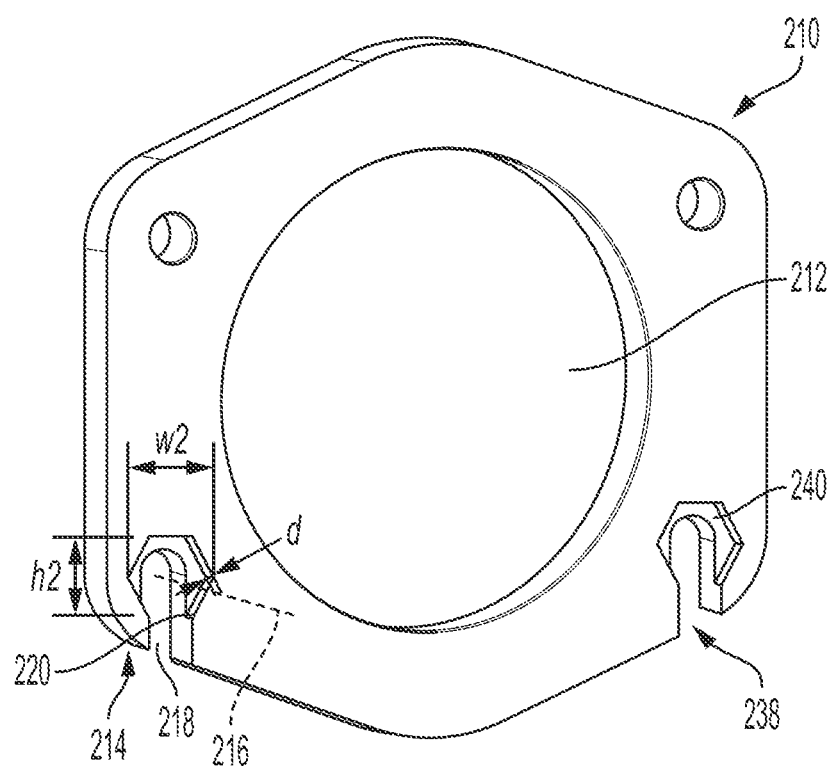
FIG. 11 is a front view of a mounting plate.

Referring to FIG. 10, a perspective view of the aftertreatment system first component 108 is shown. The aftertreatment system first component 108 includes a first mounting plate 210 (e.g., flange, plate, bracket, etc.). As shown in FIG. 11, the first mounting plate 210 includes a component aperture 212. The component aperture 212 receives a portion of the aftertreatment system first component 108 so as to couple to the aftertreatment system first component 108. In some embodiments, the first mounting plate 210 is integrally formed with the aftertreatment system first component 108.

The first mounting plate 210 includes a first aperture 214 (e.g., first aperture, second aperture, additional aperture, etc.). The first aperture 214 may be centered on a first aperture axis 216. The first aperture 214 is formed on the first mounting plate 210 and positioned inward from a peripheral surface of the first mounting plate 210. The first aperture 214 is formed on the first mounting plate 210 approximately in a range between 0.5 in. and 2 in. (e.g., 0.475 in., 0.5 in., 0.75 in., 1 in., 1.25 in., 1.5 in., 1.75 in., 2 in., 2.1 in., etc.) from the peripheral surface of the first mounting plate 210 to the center of the first aperture. The first aperture 214 has a diameter, which may be approximately in a range between 10.5 mm to 62 mm (e.g., 9.975 mm, 10.5 mm, 13 mm, 15 mm, 17 mm 19 mm, 21 mm, 23 mm, 25 mm, 28 mm, 31 mm, 34 mm, 37 mm, 40 mm, 43 mm, 46 mm, 50 mm, 58 mm, 62 mm 65.1 mm, etc.).. In some embodiments the first aperture 214 has a diameter, which may be approximately in a range between 0.41 in. and 2.44 in. (e.g., 0.389 in., 0.41, 0.51 in., 0.59 in., 0.66 in., 0.74 in., 0.82 in., 0.90 in., 0.98 in., 1.10 in., 1.22 in., 1.33 in., 1.45 in., 1.57 in., 1.69 in., 1.81 in., 1.96 in., 2.28 in., 2.44 in., 2.56 in., etc.). The first aperture 214 receives a portion of the shaft 206 of the aftertreatment component hanger rod 182 such that the portion of the shaft 206 extends through the first aperture 214.

Figure 12:
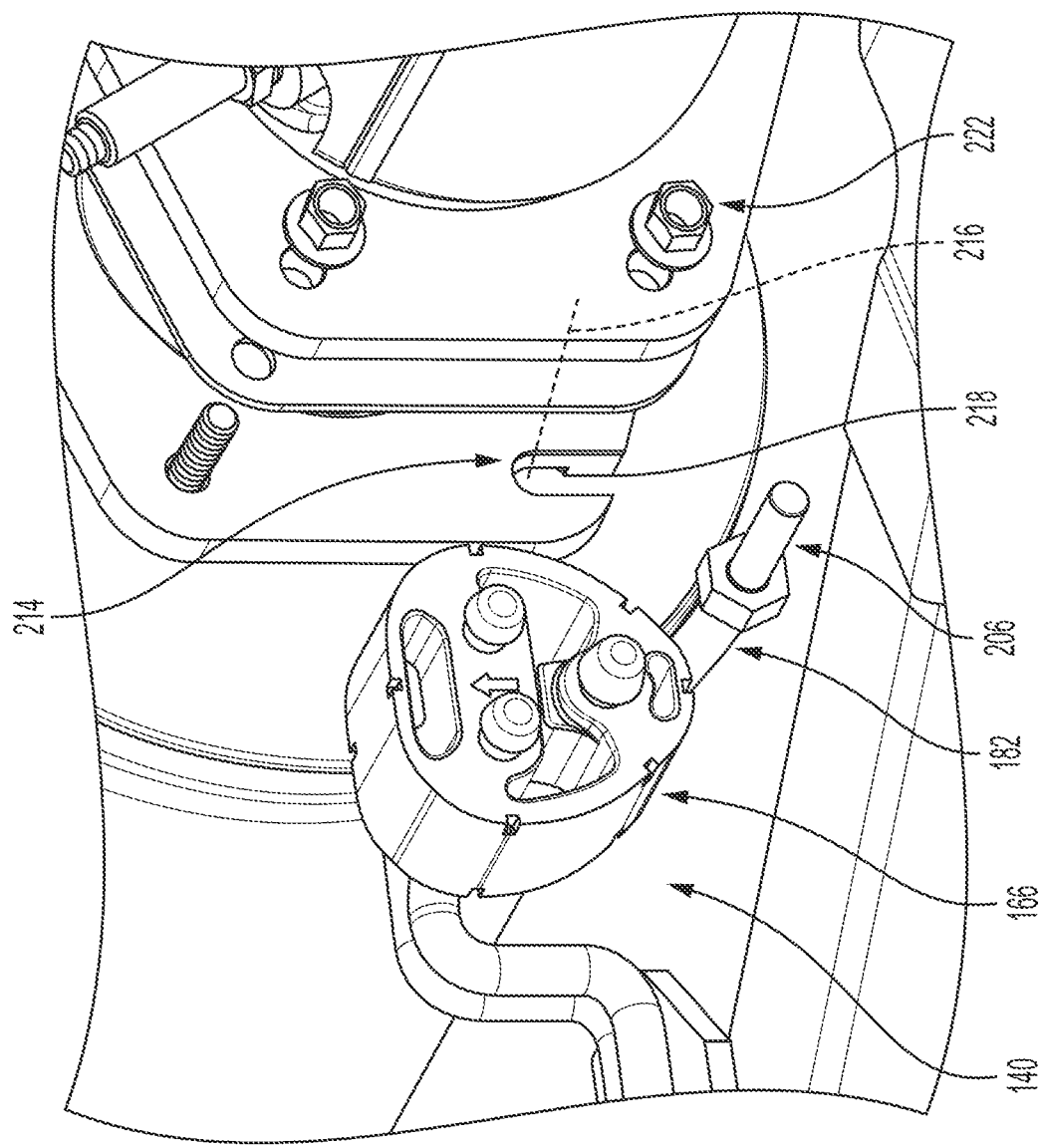
FIG. 12 is another perspective view of a portion of the aftertreatment system of FIG. 2.

As shown in FIG. 11, the first aperture 214 is a slot, which extends inward from a peripheral surface of the first mounting plate 210. The slot may extend from the peripheral surface approximately in a range between 0.25 in. and 0.5 in. (e.g., 0.2375 in., 0.25 in., 0.35 in., 0.45 in., 0.5 in., 0525 in., etc.). The slot includes a first mounting plate opening 218. The first mounting plate opening 218 is formed at the peripheral surface of the first mounting plate 210. As shown in FIG. 12, a perspective view of the mounting system 140 and the first mounting plate 210, the first mounting plate opening 218 receives the shaft 206. The aftertreatment component hanger rod 182 is rotated about the isolator mount 166 toward the first mounting plate 210 until the portion of the shaft 206 of the aftertreatment component hanger rod 182 passes through the first mounting plate opening 218 and is positioned within the first aperture 214. In some embodiments, the aftertreatment component hanger rod 182 is rotated until the portion of the shaft 206 is centered on the first aperture axis 216. In some embodiments where the first aperture is not a slot, the aftertreatment component hanger rod 182 is moved (e.g., translated, shifted, etc.) toward the first mounting plate 210 such that the portion of the shaft 206 extends through the first aperture 214.

Referring back to FIG. 11, the first mounting plate 210 further includes a non-circular recessed portion 220. The non-circular recessed portion 220 is aligned with the first aperture 214. In some embodiments, the non-circular recessed portion 210 is centered on first aperture axis 216. The non-circular recessed portion 220 has a second shape (e.g., ovular, hexagonal, parabolic, hyperbolic, grooved, curvilinear, etc.). The second shape of the non-circular recessed portion 220 is hexagonal. The height, h2, of the non-circular recessed portion 220 may be approximately in a range of 0.25 in to 1.0 in (e.g., e.g., 0.2375 in., 0.25 in., 0.35 in., 0.45 in., 0.55 in., 0.65 in., 0.75 in., 0.85 in., 0.95 in., 1.0 in., 1.05 in., etc.). In some embodiments, the height, h2, of the non-circular recessed portion 220 may be approximately in a range of 18 mm to 54 mm (e.g., 20.9 mm, 22 mm, 26 mm, 30 mm, 34 mm, 38 mm, 42 mm, 46 mm, 50 mm, 54 mm, etc.). The width, w2, of the non-circular recessed portion 220 is substantially similar to the height of the non-circular recessed portion 220. The non-circular recessed portion 220 further has a depth, d, which may be approximately in a range between 0.25 in. and 0.5 in. (e.g., 0.2375 in., 0.25 in., 0.35 in., 0.45 in., 0.5 in., 0525 in., etc.). In some embodiments, the non-circular recessed portion 220 further has a depth, d, which may be approximately in a range between 6 mm to 12 mm (e.g., 5.7 mm, 6 mm, 7 mm, 8 mm, 9 mm, 10 mm, 11 mm, 12 mm, 12.6 mm, etc.). The depth may be measured along the first aperture axis 216.

In some embodiments, the second shape of the non-circular recessed portion 220 is a combination of being linear and curved. For example, the non-circular recessed portion 220 includes a plurality of sides including a first side and a second side where the first side is contiguous with the second side. The first side may be a flat side and the second side may be a curved or arc-shaped side. In some embodiments, the first side and the second may be curved or arc-shaped.

Figure 13:
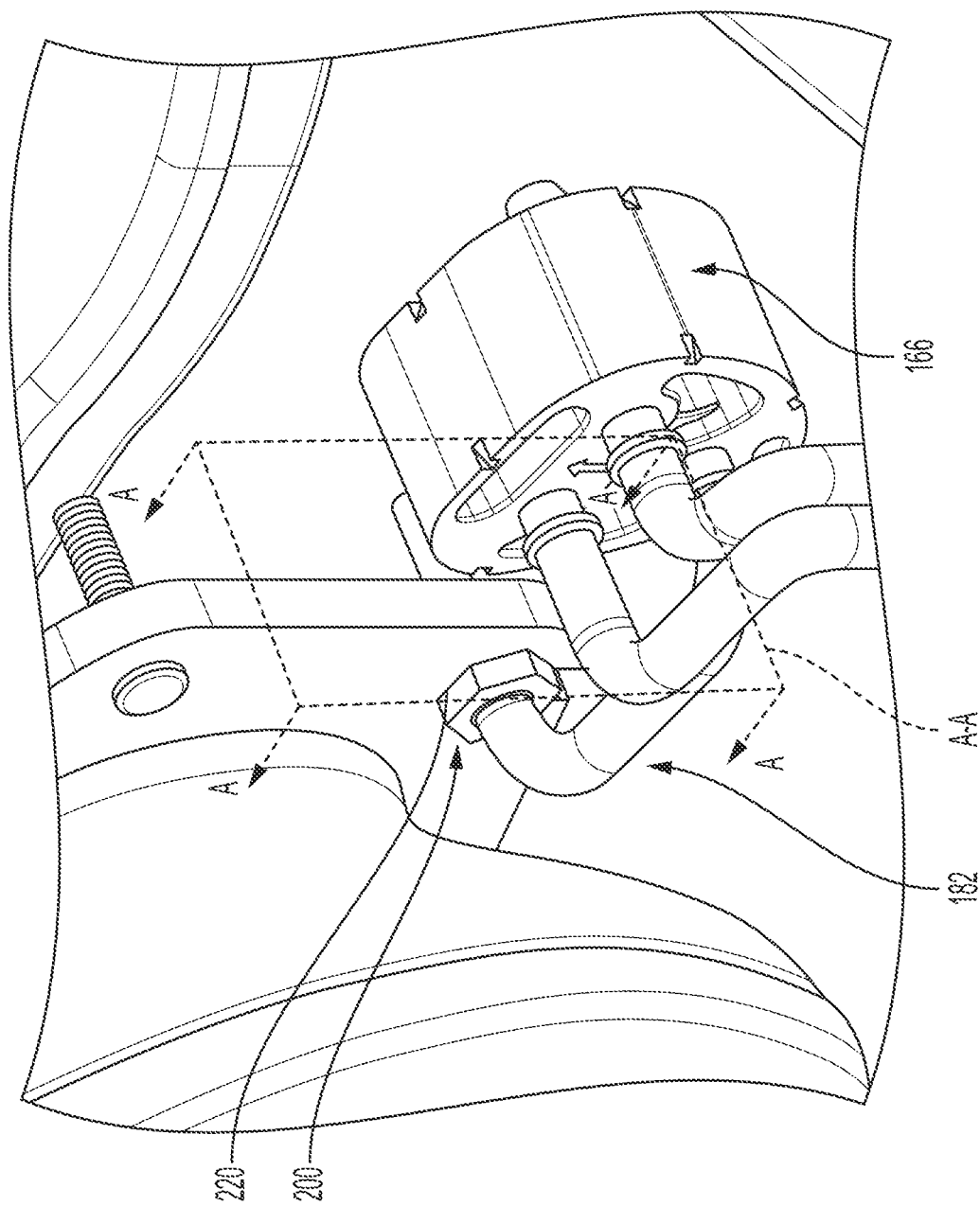
FIG. 13 is another perspective view of a portion of the aftertreatment system of FIG. 2.
Figure 14:
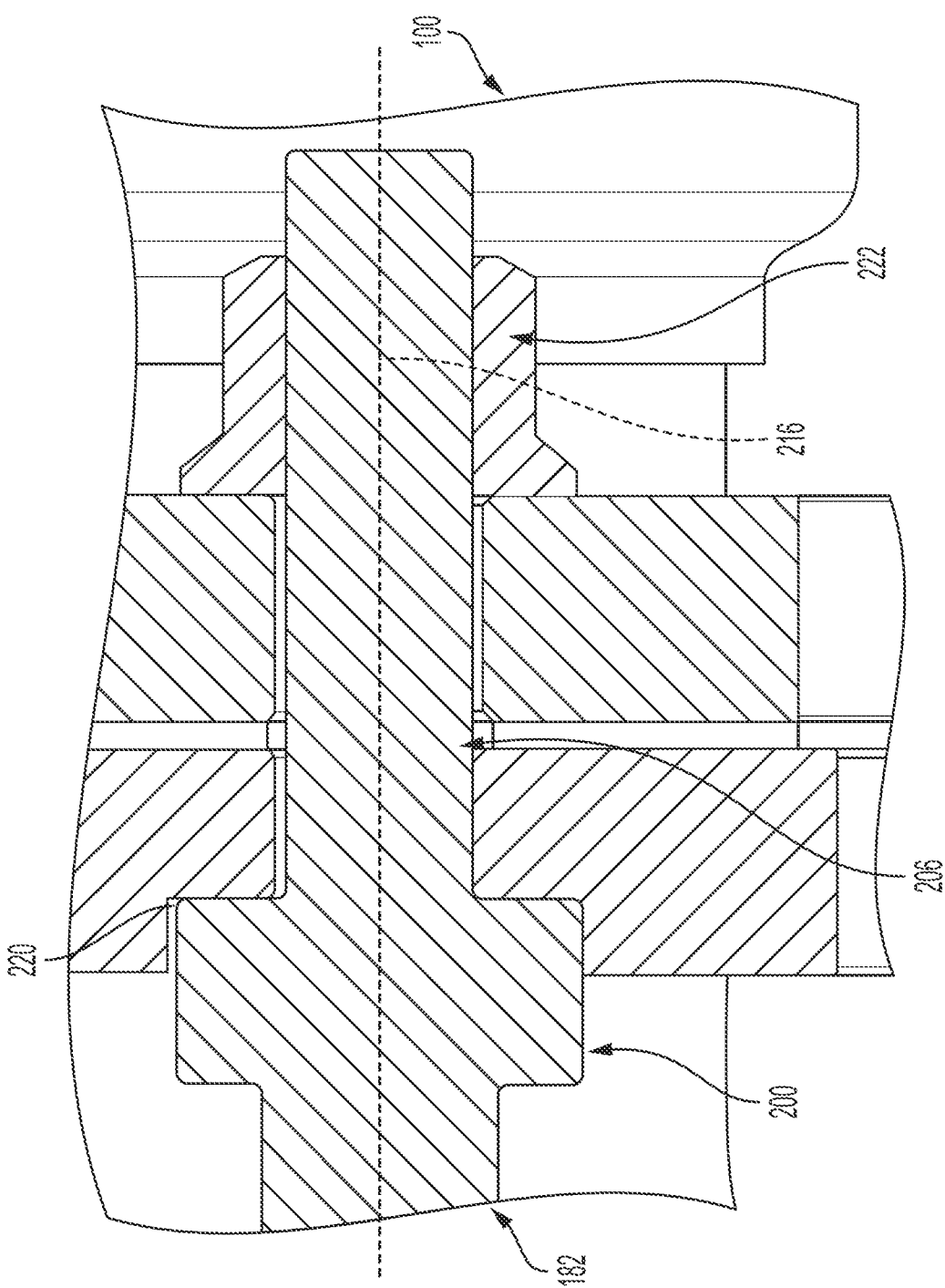
FIG. 14 is a cross-sectional view of the portion of the aftertreatment system of FIG. 13 taken along plane A-A shown in FIG. 13.

As shown in FIGS. 13 and 14, the non-circular recessed portion 220 is configured to receive a portion of the non-circular mounting head 200. To receive the portion of the non-circular mounting head 200, the second shape of the non-circular recessed portion 220 is geometrically similar to the first shape of the non-circular mounting head 200. As used herein, geometrically similar is defined as two elements having the same shape. For example, the first side of the non-circular recessed portion 220 may be a flat side and the first side of the non-circular mounting head 200 may be a flat side such that the first side of the non-circular recessed portion 220 receives the first side of the non-circular mounting head 200 and the non-circular mounting head 200 is engaged with the non-circular recessed portion 220. In another example, the non-circular recessed portion 220 may be hexagonal and the non-circular mounting head 200 may be hexagonal such that the non-circular recessed portion 220 receives the non-circular mounting head 200 and the non-circular mounting head 200 is engaged with the non-circular recessed portion 220. In yet another example, the first side of the non-circular recessed portion 220 may be an arced side and the first side of the non-circular mounting head 200 may be an arc side such that the first side of the non-circular recessed portion 220 receives the first side of the non-circular mounting head 200 and the non-circular mounting head 200 is engaged with the non-circular recessed portion 220.

In contrast, two elements are not geometrically similar when each of the elements have their own unique shape. For example, a first element may be circular while the second element may be a square. In another example, the first element may be hexagonal while the second element may be arced.

Referring back to FIGS. 13 and 14, the aftertreatment component hanger rod 182 is moved toward the first mounting plate 210 until the portion of the non-circular mounting head 200 is received by and positioned within the non-circular recessed portion 220. Further, the depth of the non-circular recessed portion 220 is less than the thickness of the non-circular mounting head 200 such that a portion of the non-circular mounting head 200 is not positioned within the non-circular recessed portion 220. By this was, the non-circular mounting head 200 is prevented from being jammed (e.g., stuck, irremovable, etc.) from the non-circular recessed portion 220 when positioned.

In some embodiments, the portion of the non-circular mounting head 200 is positioned within non-circular recessed portion 220 to form an interference fit. For example, the first shape of the non-circular mounting head 200 is hexagonal and the second shape of the non-circular recessed portion 220 is hexagonal, such that the portion of the non-circular mounting head 200 aligns with non-circular recessed portion 220 and forms an interference fit when positioned within the non-circular recessed portion 220.

Figure 15:
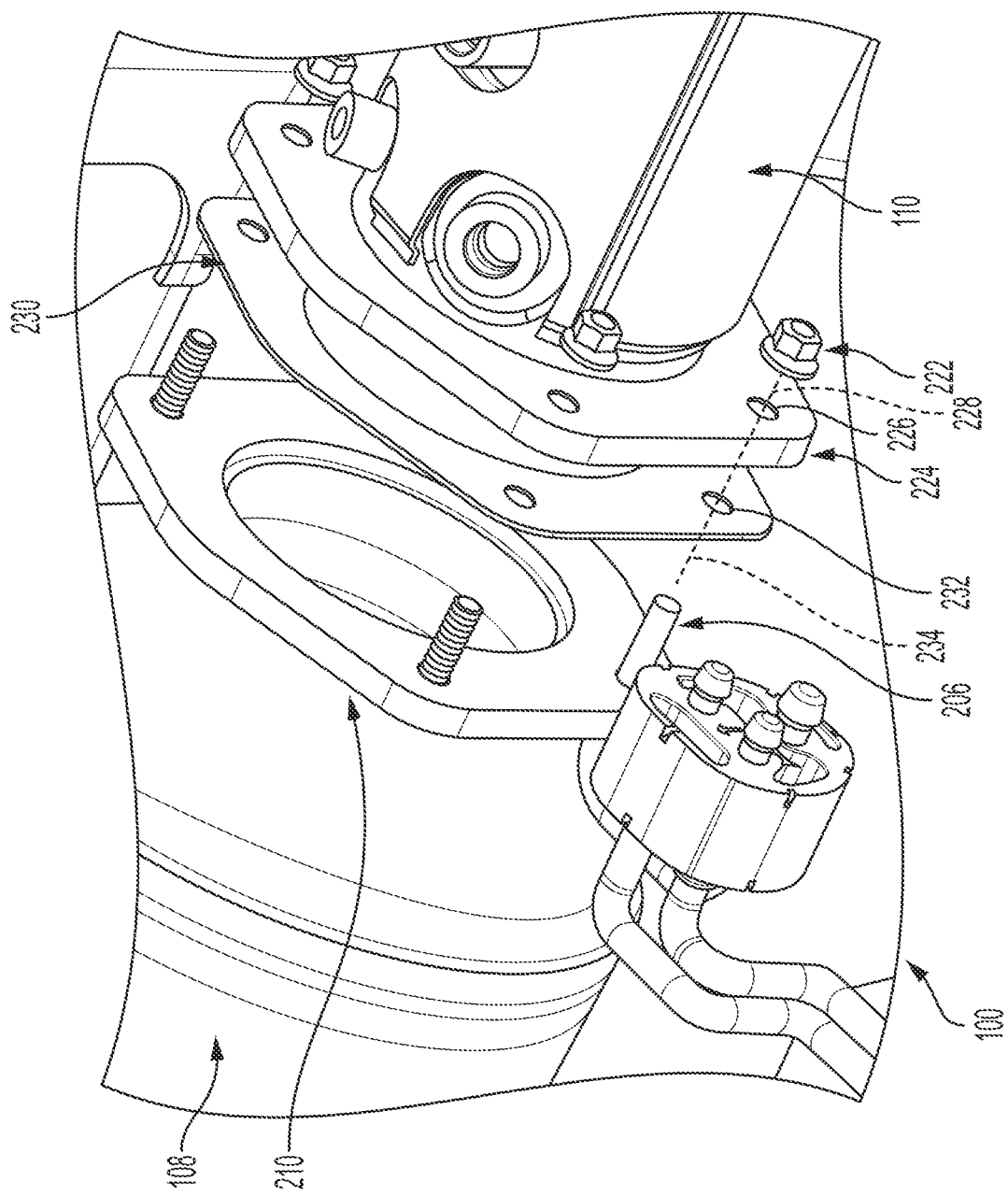
FIG. 15 is an exploded view of another aftertreatment system.

As seen in FIG. 15, a side view of the mounting system 140 and the first mounting plate 210, by positioning a portion of the non-circular mounting head 200 within the non-circular recessed portion 220, rotation of the aftertreatment component hanger rod 182 about the isolator mount 166 is prevented. The rotation of the aftertreatment component hanger rod 182 about the isolator mount 166 is prevented because a portion of the non-circular mounting head 200 rests (e.g., abuts, touches, etc.) on an edge of the non-circular recessed portion 220. Further, the positioning facilitates removable coupling of the aftertreatment system first component to the mounting system 140. By this way, the aftertreatment system first component 108 may be coupled to the chassis 142 of the vehicle.

Moreover, the non-circular mounting head 200 and the non-circular recessed portion 220 are non-circular so as to prevent rotation of the aftertreatment component hanger rod 182 about the non-circular recessed portion 220. For example, in this arrangement, when the non-circular mounting head 200 is engaged with the non-circular recessed portion 220, the aftertreatment component hanger rod 182 is prevented from rotating about the aftertreatment system first component 108. By this way, the movement of the exhaust gas aftertreatment system 101 is limited when the vehicle is operated. Specifically, as the vehicle is operated, a portion of the exhaust gas aftertreatment system 101 experiences movement. However, due to the prevention of rotation of the aftertreatment component hanger rod 182 about the aftertreatment system first component 108, the movement of the portion of the exhaust gas aftertreatment system is reduced by eliminating a degree of freedom. This facilitates the portion of the exhaust gas aftertreatment system to remain at the position it was coupled in and avoid damage from contacting other portions of the exhaust gas aftertreatment system 101 or the chassis 142 of the vehicle during vehicle operation. Further, by preventing rotation, a fastener, as described herein may stay fastened to the shaft 206.

In contrast, if the non-circular mounting head 200 was circular and the non-circular recessed portion 220 was circular, the aftertreatment component hanger rod 182 would be free to rotate about the aftertreatment system first component 108 and the isolator mount 166. By this way, as the portion of the exhaust gas aftertreatment system moves during operation of the vehicle, the non-circular mounting head 200 may rotate about the non-circular recessed portion 220, facilitated greater movement of the exhaust gas aftertreatment system. Additionally, the rotation may also unfasten a fastener, as described herein, causing additional damage to the exhaust gas aftertreatment system 101.

Referring back to FIG. 9, the mounting system 140 of the exhaust gas aftertreatment system 101 includes a fastener 222 (e.g., bolt, pin, split pin, nut, rod, etc.). The fastener 222 is coupled to retainer 208 of the shaft 206 to fasten the first mounting plate 210 between the non-circular mounting head 200 and the fastener 222. By this way, the aftertreatment component hanger rod 182 is coupled to the first mounting plate 210. In some embodiments, the fastener 222 includes threads (e.g., male threads, female threads, etc.) which interact with the retainer 208 of the shaft 206. For example, the retainer 208 of the shaft 206 may be male threads, which facilitate the fastener 222 to be screwed on to the shaft 206.

Figure 16:
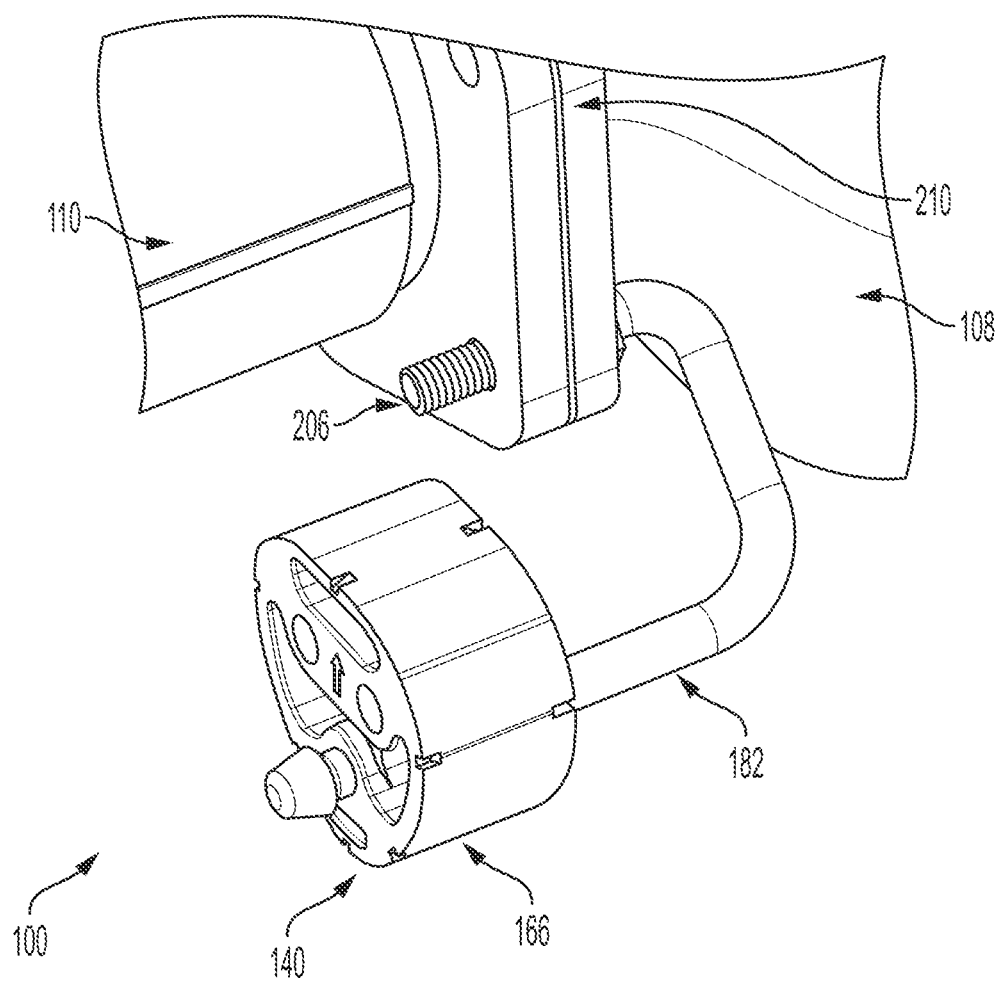
FIG. 16 is a perspective view of embodiment portion of the aftertreatment system of FIG. 15.

Referring back to FIG. 15, a perspective view of a portion the exhaust gas aftertreatment system 101 is shown. The exhaust gas aftertreatment system 101 includes the aftertreatment system second component 110, as described herein. The aftertreatment system second component 110 includes a second mounting plate 224. The second mounting plate 224 couples to the aftertreatment system second component 110. In some embodiments, the second mounting plate 224 is integrally formed with the aftertreatment system second component 110. The second mounting plate 224 includes a second aperture 226. The second aperture 226 is centered on a second aperture axis 228. The second aperture 226 is configured to receive a portion of the shaft 206 such that the aftertreatment system second component 110 may be coupled to the aftertreatment system first component 108. In operation, the second mounting plate 224 is aligned with the first mounting plate 210 such that the second aperture 226 is aligned with the first aperture 214. In some embodiments, the second aperture 226 is aligned with the first aperture 214 such that the second aperture axis 228 is the same as the first aperture axis 216. As seen in FIG. 16, the aftertreatment system second component 110 is moved toward the aftertreatment system first component until the aftertreatment system second component 110 abuts the aftertreatment system first component 108 and a portion of shaft 206 extends through the second aperture 226. The portion of the shaft 206 extends through the second aperture 226 such that the shaft 206 is extending away from the second mounting plate 224. The fastener 222 is fastened to the retainer 208, as described herein and the aftertreatment system second component 110 is coupled to the aftertreatment system first component 108. By this way the aftertreatment system first component 108 and the aftertreatment system second component 110 may be coupled to the chassis 142 of the vehicle.

In some embodiments, the exhaust gas aftertreatment system 101 further includes a gasket 230 (e.g., seal, flange, sealing ring, etc.). The gasket 230 may be positioned between the first mounting plate 210 and the second mounting plate 224. The gasket 230 seals the aftertreatment system first component 108 and the aftertreatment system second component 110 such that exhaust gas flowing from the aftertreatment system first component 108 to the aftertreatment system second component 110 is restricted from escaping. The gasket 230 includes a gasket aperture 232. The gasket aperture 232 is centered on a gasket aperture axis 234. The gasket aperture 232 is aligned with the first aperture 214 and a portion of the shaft 206 extends through the gasket aperture 232. In some embodiments, the gasket aperture 232 is aligned with the first aperture 214 such that the gasket aperture axis 234 and the first aperture axis 216 are the same.

Figure 17:
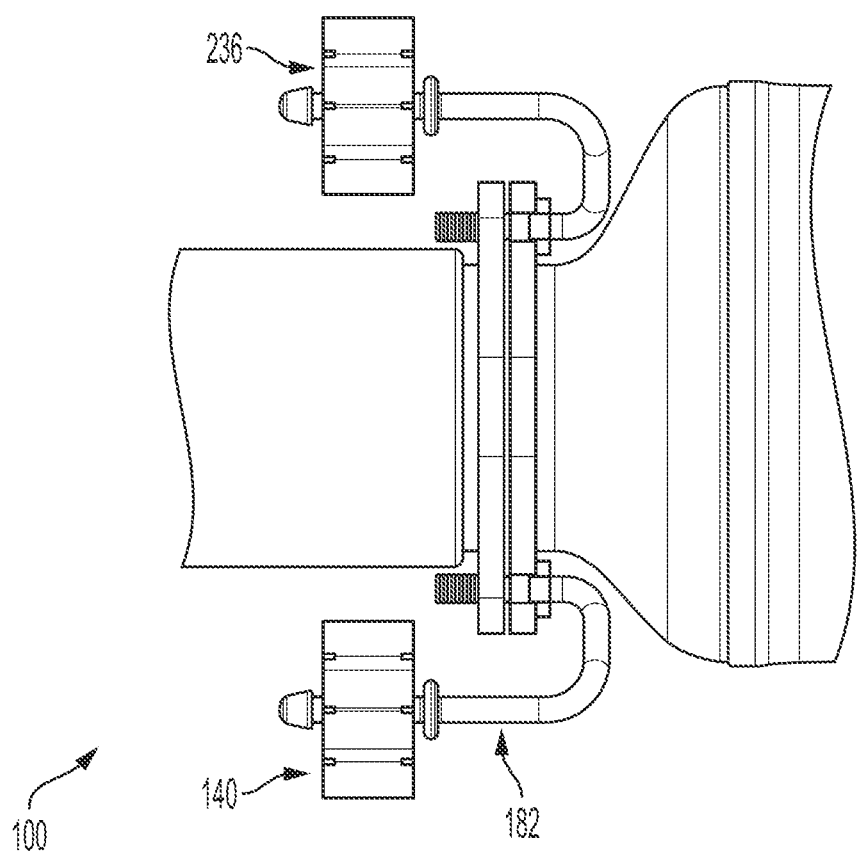
FIG. 17 is a perspective view of a portion of another aftertreatment system.

Referring to FIG. 17, a perspective view of the exhaust gas aftertreatment system 101 is shown. The exhaust gas aftertreatment system 101 may include a second mounting system 236. The second mounting system 236 is substantially similar to the mounting system 140 and therefore not described in further detail. Referring to FIG. 11, the first mounting plate 210 includes an additional aperture 238. The additional aperture 238 is located distally from the first aperture 214. The additional aperture is substantially similar to the first aperture 214. The additional aperture 238 includes a second non-circular recessed portion 240, which is similar to the non-circular recessed portion 220. In some embodiments, the second non-circular recessed portion 240 is aligned with the additional aperture. The additional aperture 238 is configured to receive the second mounting system 236 in a similar manner as the first aperture 214 receives the mounting system 140. The second mounting system 236 coupled to the additional aperture 238 and the mounting system 140 coupled to the first aperture 214 provide the benefit of supporting the aftertreatment system first component 108 when aftertreatment system first component 108 is coupled to the chassis 142 of the vehicle. In some embodiments, the second mounting system 236 supports the aftertreatment system first component 108 and the aftertreatment system second component 110. The second mounting system 236 and the mounting system 140 may restrict the rotation of the aftertreatment system first component 108. Specifically, in some embodiments, the weight of at least one of the aftertreatment system first component 108 or the aftertreatment system second component 110 would cause the isolator mount connection portion 184 of the aftertreatment component hanger rod 182 to rotate about the aftertreatment component hanger rod through-hole 178. When the second mounting system 236 is coupled to at least one of the aftertreatment system first component 108 or the aftertreatment system second component 110, the second mounting system 236 and the mounting system 140 cooperate with one another to apply a counteractive force on the portion of the exhaust gas aftertreatment system 101 to restrict movement when coupled to the chassis 142 of the vehicle.

Figure 18:
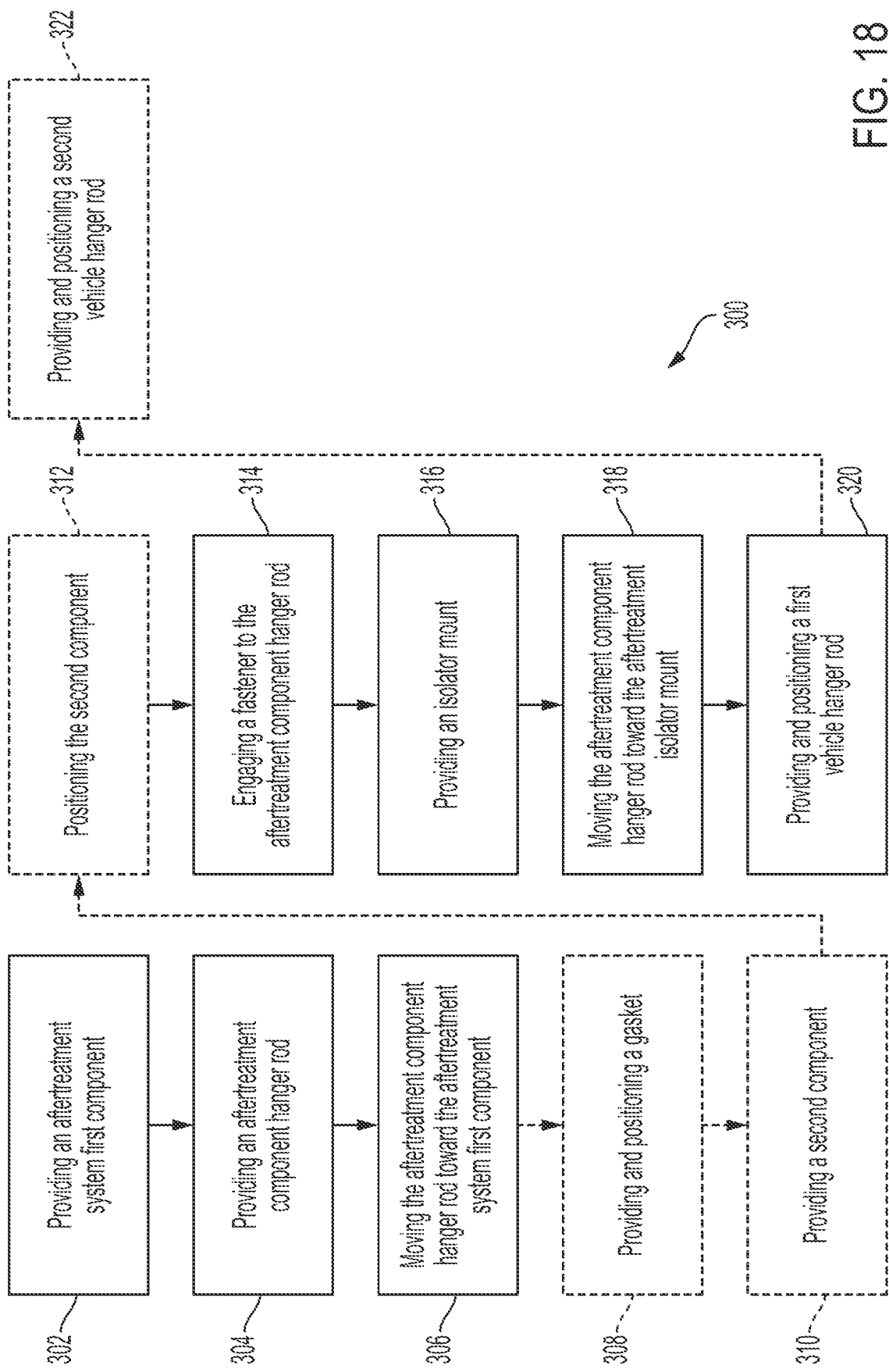
FIG. 18 is a block diagram illustrating a method of mounting a portion of an aftertreatment system to a chassis.

Referring to FIG. 18, a block diagram of a method 300 of mounting an exhaust gas aftertreatment system 101 is shown. In step 302, an aftertreatment system first component 108 is provided. The aftertreatment system first component 108 includes a first mounting plate 210 including a first aperture 214 and a non-circular recessed portion 220. The first aperture 214 is formed in first mounting plate 210. In some embodiments, the first aperture 214 may be a slot, which extends to the peripheral surface of the first mounting plate 210. The non-circular recessed portion 220 of the first mounting plate 210 includes a plurality of sides. In some embodiments, at least one side of the plurality of sides of the non-circular recessed portion 220 is flat. The at least one side of the plurality of sides of the non-circular recessed portion 220 may also be arc-shaped (e.g., ovular, rounded, etc.). In some embodiments, each of the plurality of sides of the non-circular recessed portion 220 is arc-shaped (e.g., the non-circular recessed portion 220 is pentalobe-shaped, etc.). In yet another embodiment, at least one side of the plurality of sides of the non-circular recessed portion 220 is flat and at least one side of the plurality of sides is arc-shaped and the flat side is contiguous with the arc-shaped side.

In step 304, an aftertreatment component hanger rod 182 (e.g., a first hanger rod, a second hanger rod, a third hanger rod, etc.) is provided. The aftertreatment component hanger rod 182 includes a mounting plate connection portion 196. The mounting plate connection portion 196 includes a non-circular mounting head 200 and a shaft 206. The non-circular mounting head 200 may be coupled to the mounting plate connection portion 196. In some embodiments, the non-circular mounting head 200 may be integrally formed with the mounting plate connection portion 196. The non-circular mounting head 200 includes a plurality of sides. In some embodiments, at least one side of the plurality of sides is flat. The at least one side of the plurality of sides may also be arc-shaped (e.g., ovular, rounded, etc.). In some embodiments, each of the plurality of sides is arc-shaped. In yet another embodiment, at least one side of the plurality of sides is flat and at least one side of the plurality of sides is arc-shaped and the flat side is contiguous with the arc-shaped side. The shaft 206 extends from the non-circular mounting head 200 and may be integrally formed with the non-circular mounting head 200. The shaft 206 includes a retainer 208 for receiving a fastener 222. The aftertreatment component hanger rod 182 also includes an isolator mount connection portion 184. The isolator mount connection portion 184 is contiguous with and opposite of the mounting plate connection portion 196.

In step 306, the aftertreatment component hanger rod 182 is moved (e.g., translated, rotated, etc.) toward the aftertreatment system first component 108 and a portion of the aftertreatment component hanger rod 182 is positioned within the first aperture 214 of the mounting plate. The portion of the aftertreatment component hanger rod 182 is positioned within the first aperture 214 so such that a portion of the shaft 206 extends through the first aperture 214. The aftertreatment component hanger rod 182 is moved such that the non-circular mounting head 200 engages the non-circular recessed portion 220 and prevents rotation of the aftertreatment component hanger rod 182 relative to the first mounting plate 210. In some embodiments, as the non-circular mounting head 200 engages the non-circular recessed portion 220, at least one side of the non-circular mounting head 200 which is flat engages the at least one side of the non-circular recessed portion 220 which is flat. The at least one side of the non-circular mounting head 200 may be arced and may engage at least one side of the non-circular recessed portion 220 which also may be arced.

In some embodiments, the method 300 may go to step 308. In step 308, a gasket 230 is provided and positioned. The gasket 230 includes a gasket aperture 232, which is aligned with the first aperture 214. The gasket 230 is positioned such that a portion of the shaft 206 extends through the gasket 230 aperture. The gasket 230 is positioned to abut the first mounting plate 210 of the aftertreatment system first component 108.

In some embodiments, the method 300 may go to step 310. In step 310, an aftertreatment system second component 110 is provided. The aftertreatment system second component 110 includes a second mounting plate 224. The second mounting plate 224 includes a second aperture formed in the second mounting plate 224. The method 300 may then go to step 312. In step 312, the aftertreatment system second component 110 is positioned. Specifically, the second aperture of the second mounting plate 224 is aligned with the first aperture 214. In some embodiments, the second aperture is aligned with both the gasket aperture 232 and the first aperture 214. The second mounting plate 224 is then positioned such that a portion of the shaft 206 extends through the second aperture and the second mounting plate 224 abuts the first mounting plate 210. In some embodiments, the second mounting plate 224 is positioned to abut the gasket 230 such that the gasket 230 seals the first mounting plate 210 and the second mounting plate 224 to restrict exhaust gas from escaping. The aftertreatment system second component 110 may be positioned such that the second mounting plate 224 abuts the first mounting plate 210 and then the aftertreatment component hanger rod 182 is moved toward the first mounting plate 210 and the non-circular mounting head 200 is engaged with the non-circular recessed portion 220.

The method 300 continues at step 314. In step 314, a fastener 222 is engaged to the retainer 208 on the shaft 206. The fastener 222 couples the aftertreatment component hanger rod 182 to the aftertreatment system first component 108 such that the non-circular mounting head 200 and the non-circular recessed portion 220 may not be disengaged. In some embodiments, the fastener 222 engages the retainer 208 of the shaft 206 such that the aftertreatment system first component 108 and the aftertreatment second component are coupled to the aftertreatment component hanger rod 182.

In step 316, an isolator mount 166 is provided. In step 318, the isolator mount connection portion 184 is moved toward isolator mount 166 such that a portion of the isolator mount connection portion 184 of the aftertreatment component hanger rod 182 engages with the aftertreatment component hanger rod through-hole 178. By this way, the aftertreatment component hanger rod 182 is coupled to the isolator mount 166. In some embodiments, the isolator mount 166 is moved toward the aftertreatment component hanger rod 182 so as to engage the aftertreatment component hanger rod 182 to the aftertreatment component hanger rod through-hole 178.

In step 320, a first vehicle hanger rod 146 is provided. A portion of the first vehicle hanger rod 146 is moved toward the isolator mount 166 so as to engage the first vehicle hanger rod through-hole 170. By this way, the first vehicle hanger rod 146 is coupled to the isolator mount 166. In some embodiments, the isolator mount 166 is moved toward the first vehicle hanger rod 146 such that the first vehicle hanger rod 146 engages the first vehicle hanger rod through-hole 170. A portion of the vehicle hanger rod is coupled to a chassis flange 144. The chassis flange 144 is coupled to a chassis 142 of a vehicle such that the aftertreatment system first component 108 is coupled to the chassis 142 of the vehicle.

The method 300 may continue in step 322 where a second vehicle hanger rod 156 is provided. A portion of the second vehicle hanger rod 156 is moved toward the isolator mount 166 so as to engage the second vehicle hanger rod through-hole 174. By this way, the second vehicle hanger rod 156 is coupled to the isolator mount 166. In some embodiments, the isolator mount 166 is moved toward the second vehicle hanger rod 156 such that the second vehicle hanger rod 156 engages the second vehicle hanger rod through-hole 174. A portion of the second vehicle hanger rod 156 is coupled to a chassis flange 144. By this method, the exhaust gas aftertreatment system is coupled to the chassis 142 of the vehicle.

Figure 19:
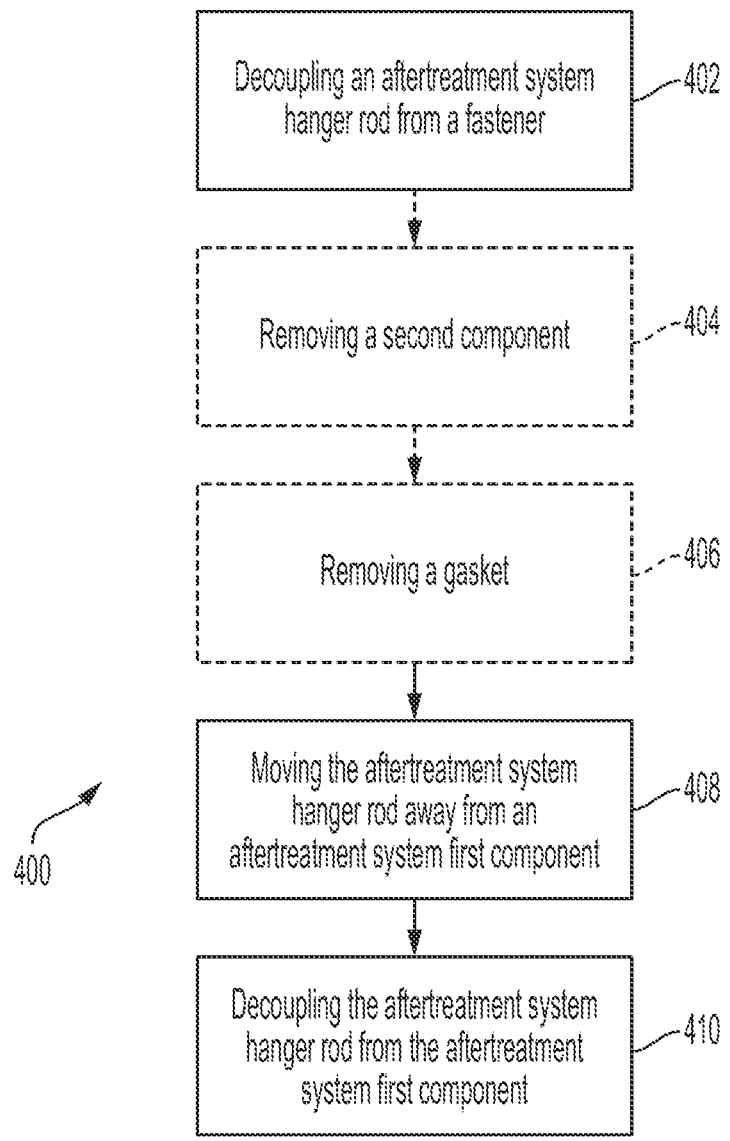
FIG. 19 is a method of dismounting a portion of an aftertreatment system from a chassis.

Referring to FIG. 19, a block diagram of method 400 of decoupling the mounting system is shown. In step 402, an aftertreatment component hanger rod 182 is decoupled from a fastener 222. Specifically, the fastener 222 is unfastened from the retainer 208.

In step 404, an aftertreatment system second component 110 is removed. The aftertreatment system second component 110 is removed such that the portion of the shaft 206 no longer extends through the second aperture of the second mounting plate 224 of the aftertreatment system second component 110. The method may go to step 406.

In step 406, a gasket 230 is removed. The gasket 230 is removed so that the portion of the shaft 206 no longer extends through the gasket aperture 232.

In step 408, the aftertreatment component hanger rod 182 is moved away from an aftertreatment system first component 108. The aftertreatment component hanger rod 182 is moved away such that a non-circular mounting head 200 of the aftertreatment component hanger rod 182 is disengaged from a non-circular recessed portion 220 of a first mounting plate 210 of the aftertreatment system first component 108.

In step 410, the aftertreatment component hanger rod 182 is decoupled from the aftertreatment system. Specifically, the aftertreatment component hanger rod 182 is moved such that a portion of a shaft 206 of the aftertreatment component hanger rod 182 is no longer extending through a first aperture 214 of the first mounting plate 210. In some embodiments, when the first aperture 214 is a slot, which extends to a peripheral surface of the first mounting plate 210, the aftertreatment component hanger rod 182 is rotated away from the first mounting plate 210 and through the first aperture 214. By this way, the aftertreatment component hanger rod 182 is decoupled from the first mounting plate 210 and the portion of the exhaust gas aftertreatment system 101 is decoupled from the chassis 142 of the vehicle IV. Configuration of Example Embodiments As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "configured to receive exhaust gas from," "configured to receive air from," "configured to receive reductant from," and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An aftertreatment system comprising:
   an aftertreatment system first component comprising a first mounting plate, the first mounting plate comprising:
      a first aperture, and
      a non-circular recessed portion aligned with the first aperture; and
   a first hanger rod comprising:
      a connection portion;
      a mounting plate connection portion connected to the first mounting plate, wherein the mounting plate connection portion is contiguous with a first end of the connection portion and extends at a transverse angle with respect to the connection portion, the mounting plate connection portion comprising:
         a non-circular mounting head having a portion that is engaged with a portion of the non-circular recessed portion so as to prevent rotation of the mounting plate connection portion relative to the first mounting plate, and
         a shaft extending from the connection portion through the non-circular mounting head and the first aperture; and
      an isolator mount connection portion configured to be connected to an isolator mount, wherein the isolator mount is contiguous with a second end of the connection portion opposite the first end.

2. The aftertreatment system of claim 1, wherein:
   the non-circular mounting head has a first shape;
   the non-circular recessed portion has a second shape; and
   the first shape and the second shape are geometrically similar.

3. The aftertreatment system of claim 1, wherein the non-circular mounting head comprises a first flat side.

4. The aftertreatment system of claim 3, wherein the non-circular mounting head comprises a curved side contiguous with the first flat side.

5. The aftertreatment system of claim 3, wherein the non-circular recessed portion comprises a flat side configured to receive the at least one flat side of the non-circular mounting head when the portion of the non-circular mounting head is engaged within the portion of the non-circular recessed portion.

6. The aftertreatment system of claim 1, wherein the non-circular mounting head comprises of a plurality of sides, each of the sides being arc-shaped.

7. The aftertreatment system of claim 1, wherein:
   the non-circular mounting head is hexagonal; and
   the non-circular recessed portion is hexagonal and forms an interference fit with the non-circular mounting head.

8. The aftertreatment system of claim 1, wherein the non-circular recessed portion has a depth in a range between 0.25 inches and 0.5 inches.

9. The aftertreatment system of claim 1, wherein the first aperture is a slot that extends inward from a peripheral surface of the first mounting plate.

10. The aftertreatment system of claim 1, wherein the non-circular recessed portion is spaced from a peripheral surface of the first mounting plate.

11. The aftertreatment system of claim 1, further comprising an aftertreatment system second component comprising a second mounting plate, the second mounting plate comprising a second aperture aligned with the first aperture;
    wherein a portion of the shaft extends through the first aperture and the second aperture and is configured to facilitate coupling of the aftertreatment system first component to the aftertreatment system second component.

12. The aftertreatment system of claim 1, wherein the first mounting plate further comprises:
    an additional aperture positioned distally from the first aperture; and
    a second non-circular recessed portion aligned with the additional aperture, the second non-circular recessed portion configured to receive the portion of the non-circular mounting head.

13. The aftertreatment system of claim 1, further comprises a fastener coupled to the shaft.

14. The aftertreatment system of claim 13, wherein the shaft comprises male threads, and the fastener comprises female threads coupled to the male threads.

15. The aftertreatment system of claim 1, further comprising:
    an isolator mount comprising a first through-hole;
    wherein the isolator mount connection portion is positioned within the first through-hole and couples the first hanger rod to the isolator mount.

16. The aftertreatment system of claim 15, further comprising:
    a second hanger rod positioned with a second through-hole of the isolator mount so as to be coupled to the isolator mount; and a third hanger rod positioned within a third through-hole of the isolator mount so as to be coupled to the isolator mount.

17. The aftertreatment system of claim 1, wherein the mounting plate connection portion extends orthogonal to the connection portion.

18. The aftertreatment system of claim 17, wherein the isolator connection portion extends orthogonal to the connection portion.

19. The aftertreatment system of claim 1, wherein a direction in which the mounting plate connection portion extends is parallel to a direction in which the isolator plate connection portion extends.

20. The aftertreatment system of claim 19, wherein a length of the mounting plate connection portion is greater than a length of the isolator connection portion.

21. A method of mounting an aftertreatment system, the method comprising:
   providing an aftertreatment system first component comprising a first mounting plate comprising a first aperture and a non-circular recessed portion;
   providing a first hanger rod comprising:
      a connection portion,
      a mounting plate connection portion connected to the first mounting plate, wherein the mounting plate connection portion is contiguous with a first end of the connection portion and extends at a transverse angle with respect to the connection portion, the mounting plate connection portion comprising:
         a non-circular mounting head,
         a shaft, and
      an isolator mount connection portion configured to be connected to an isolator mount, wherein the isolator mount is contiguous with a second end of the connection portion opposite the first end; and
   moving the mounting plate connection portion toward the first aperture such that a portion of the mounting plate connection portion is positioned within the first aperture and a portion of the non-circular mounting head is engaged within a portion of the non-circular recessed portion to prevent rotation of the mounting plate connection portion relative to the first mounting plate.

22. The method of mounting the aftertreatment system of claim 21, wherein:
   the non-circular recessed portion of the first mounting plate provided comprises at least one flat side;
   the non-circular mounting head of the mounting plate connection portion of the first hanger rod provided comprises at least one flat side; and
   as the portion of the non-circular mounting head engages within the portion of the non-circular recessed portion, a portion of the at least one flat side of the non-circular mounting head engages with a portion of the at least one flat side of the non-circular recessed portion.

23. The method of mounting the aftertreatment system of claim 21, wherein:
   the non-circular recessed portion of the first mounting plate provided comprises a plurality of sides, each of the sides are arced;
   the non-circular mounting head of the mounting plate connection portion of the first hanger rod provided comprises a plurality of sides, each of the sides are arced; and
   as the portion of the non-circular mounting head engages within the portion of the non-circular recessed portion, a portion of each of the sides of the non-circular recessed portion engage with a portion of one of the sides of the non-circular mounting head.

24. The method of mounting the aftertreatment system of claim 21, wherein:
   the non-circular recessed portion of the first mounting plate provided comprises a plurality of sides, at least one side of the plurality of sides being flat side and at least one side of the plurality of sides being arced, the at least one arced side contiguous with the at least one flat side;
   the non-circular mounting head of the mounting plate connection portion of the first hanger rod provided comprises a plurality of sides, at least one of the plurality of sides being flat side and at least one of the plurality of sides being arced; and
   as the portion of the non-circular mounting head engages within the portion of the non-circular recessed portion, a portion of the one flat side of the non-circular mounting head engages with a portion of the one flat side of the non-circular recessed portion and a portion the one arced side of the non-circular mounting head engages with a portion of the one arced side of the non-circular recessed portion.

25. The method of mounting the aftertreatment system of claim 21, further comprising:
   engaging a fastener to the shaft so as to couple the first hanger rod to the aftertreatment system first component.

26. The method of mounting the aftertreatment system of claim 21, further comprising:
   providing an isolator mount, the isolator mount comprising a first through-hole and a second through-hole;
   moving at least one of the isolator mount or the isolator mount connection portion such that a portion of the isolator mount connection portion engages the first through-hole, so as to couple the first hanger rod to the isolator mount;
   providing a second hanger rod; and
   moving at least one of the isolator mount or the second hanger rod such that a portion of the second hanger rod engages with the second through-hole so as to couple the second hanger rod to the isolator mount.

27. The method of mounting the aftertreatment system of claim 26, further comprising:
   providing a third hanger rod; and
   moving at least one of the isolator mount or the third hanger rod such that a portion of the third hanger rod engages with a third through-hole on the isolator mount so as to couple the third hanger rod to the isolator mount.

28. The method of mounting the aftertreatment system of claim 21, further comprising:
   prior to moving the first hanger rod toward the first mounting plate:
      providing an aftertreatment system second component comprising a second mounting plate, the second mounting plate having a second mounting plate aperture, and
      aligning the second mounting plate aperture with the first aperture of the first mounting plate; and
   engaging a fastener to the shaft so as to couple the aftertreatment system second component to the aftertreatment system first component;
   wherein once the first hanger rod is moved toward the first mounting plate, the mounting plate connection portion extends into the second mounting plate aperture and the shaft extends through the second mounting plate aperture and is configured to facilitate the aftertreatment system second component abutting the aftertreatment system first component.

29. The method of mounting the aftertreatment system of claim 28, further comprising:
- decoupling the fastener from the shaft;
- decoupling the aftertreatment system second component from the aftertreatment system first component;
- moving the mounting plate connection portion away from the first mounting plate so as to disengage the non-circular mounting head from the non-circular recessed portion; and
- moving the mounting plate connection portion away from the first aperture to decouple the first hanger rod and the first mounting plate.

* * * * *